US010286306B2

(12) United States Patent
Okamura

(10) Patent No.: US 10,286,306 B2
(45) Date of Patent: May 14, 2019

(54) GAME CONTROLLER

(71) Applicant: NINTENDO CO., LTD., Minami-ku, Kyoto (JP)

(72) Inventor: Takanori Okamura, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 104 days.

(21) Appl. No.: 15/422,785

(22) Filed: Feb. 2, 2017

(65) Prior Publication Data

US 2017/0354871 A1   Dec. 14, 2017

(30) Foreign Application Priority Data

Jun. 10, 2016   (JP) .................. 2016-116700

(51) Int. Cl.
*A63F 13/24* (2014.01)
*A63F 13/28* (2014.01)
*A63F 13/25* (2014.01)

(52) U.S. Cl.
CPC .............. *A63F 13/24* (2014.09); *A63F 13/25* (2014.09); *A63F 13/28* (2014.09)

(58) Field of Classification Search
CPC ........... A63F 13/24; A63F 13/25; A63F 13/28
USPC ......................................................... 463/37
See application file for complete search history.

(56) References Cited

U.S. PATENT DOCUMENTS 4,775,573 A   10/1988 Turek
4,854,040 A   8/1989 Turek
5,134,505 A * 7/1992 Tanaka ............... H01H 9/181
  349/1
5,207,426 A   5/1993 Inoue
5,551,693 A   9/1996 Goto et al.
(Continued)

FOREIGN PATENT DOCUMENTS

CN     205081655 U    3/2016
EP     1 078 660 A1   2/2001
(Continued)

OTHER PUBLICATIONS

Office Action dated Aug. 25, 2017 issued in U.S. Appl. No. 15/370,189 to Suetake, filed Dec. 6, 2016 (35 pages).
(Continued)

*Primary Examiner* — Omkar A Deodhar
*Assistant Examiner* — Shauna-Kay Hall
(74) *Attorney, Agent, or Firm* — Nixon & Vanderhye P.C.

(57) ABSTRACT

An example of a game controller includes a key top of an operation button, a tubular light-guiding portion surrounding a periphery of the key top, a light-shielding portion surrounding a periphery of the light-guiding portion, an elastic member placed immediately below the key top and configured to allow light to pass therethrough, a switch placed below the elastic member, and an LED. The key top and the light-guiding portion are exposed through a surface of a housing of the game controller. Light from the LED is incident on the light-guiding portion and guided to a surface of the housing through the inside of the light-guiding portion. The light-guiding portion is surrounded by the light-shielding portion, and therefore, light does not come out to the periphery of the light-guiding portion. Consequently, it is possible to cause the periphery of the operation button to emit light in a ring-shaped manner.

15 Claims, 21 Drawing Sheets

(56) References Cited

U.S. PATENT DOCUMENTS

| | | | |
|---|---|---|---|
| 5,644,113 | A | 7/1997 | Date et al. |
| 6,186,896 | B1* | 2/2001 | Takeda ............... A63F 13/02 |
| | | | 273/148 B |
| 6,222,740 | B1 | 4/2001 | Bovensiepen et al. |
| 6,342,009 | B1 | 1/2002 | Soma |
| 6,350,365 | B1 | 2/2002 | Koyama et al. |
| 6,394,906 | B1 | 5/2002 | Ogata |
| 6,435,969 | B1 | 8/2002 | Tanaka et al. |
| 6,710,766 | B1 | 3/2004 | Ogata |
| 6,989,818 | B2 | 1/2006 | Biheller |
| 7,582,839 | B2* | 9/2009 | Kyowski ............... H01H 13/83 |
| | | | 200/310 |
| D709,882 | S | 7/2014 | Morris et al. |
| 8,803,739 | B2 | 8/2014 | Rajgopal et al. |
| 9,789,395 | B2 | 10/2017 | Igarashi et al. |
| 2001/0008849 | A1 | 7/2001 | Komata |
| 2002/0080112 | A1 | 6/2002 | Braun et al. |
| 2002/0128064 | A1 | 9/2002 | Sobota |
| 2003/0030533 | A1 | 2/2003 | Waffenschmidt |
| 2003/0042122 | A1 | 3/2003 | Sato |
| 2003/0216180 | A1 | 11/2003 | Shinohara et al. |
| 2004/0023719 | A1 | 2/2004 | Hussaini |
| 2004/0129542 | A1* | 7/2004 | Kawaguchi ........... H01H 9/182 |
| | | | 200/61.1 |
| 2004/0224768 | A1 | 11/2004 | Hussaini |
| 2005/0153777 | A1 | 7/2005 | Koshima |
| 2005/0269769 | A1 | 12/2005 | Naghi et al. |
| 2006/0022951 | A1* | 2/2006 | Hull ..................... A63F 13/06 |
| | | | 345/170 |
| 2006/0260921 | A1* | 11/2006 | Lee ..................... G06F 3/0202 |
| | | | 200/313 |
| 2007/0097832 | A1 | 5/2007 | Koivisto et al. |
| 2007/0281787 | A1* | 12/2007 | Numata ............... A63F 13/06 |
| | | | 463/36 |
| 2008/0143560 | A1* | 6/2008 | Shipman ............. G06F 3/0238 |
| | | | 341/22 |
| 2008/0261695 | A1 | 10/2008 | Coe |
| 2009/0011831 | A1 | 1/2009 | Yamada |
| 2009/0017911 | A1 | 1/2009 | Miyazaki |
| 2009/0054146 | A1 | 2/2009 | Epstein |
| 2009/0073724 | A1* | 3/2009 | Hayama ............... H01H 13/83 |
| | | | 362/620 |
| 2009/0289774 | A1 | 11/2009 | Choi |
| 2010/0069154 | A1 | 3/2010 | Claussen |
| 2010/0081375 | A1 | 4/2010 | Rosenblatt |
| 2010/0181176 | A1* | 7/2010 | Igarashi ............... H01H 13/83 |
| | | | 200/310 |
| 2010/0302169 | A1* | 12/2010 | Pance ................. G06F 3/0237 |
| | | | 345/170 |
| 2011/0021271 | A1 | 1/2011 | Ikeda |
| 2011/0048908 | A1* | 3/2011 | Nishino ............... H01H 13/83 |
| | | | 200/314 |
| 2011/0127149 | A1* | 6/2011 | Sun ..................... H01H 13/83 |
| | | | 200/314 |
| 2012/0108340 | A1 | 5/2012 | Ashida et al. |
| 2012/0113013 | A1* | 5/2012 | Lee ..................... G06F 3/0202 |
| | | | 345/170 |
| 2012/0142418 | A1 | 6/2012 | Muramatsu |
| 2012/0153748 | A1 | 6/2012 | Wauke |
| 2012/0268360 | A1 | 10/2012 | Mikhailov |
| 2012/0322555 | A1 | 12/2012 | Burgess |
| 2013/0213146 | A1 | 8/2013 | Amos |
| 2013/0281212 | A1 | 10/2013 | Tsuchiya et al. |
| 2014/0018173 | A1 | 1/2014 | Urhman |
| 2014/0094309 | A1 | 4/2014 | Osawa et al. |
| 2014/0315640 | A1 | 10/2014 | Goh |
| 2015/0193017 | A1 | 7/2015 | Igarashi et al. |
| 2016/0059122 | A1 | 3/2016 | Ehara et al. |
| 2016/0093452 | A1* | 3/2016 | Zercoe ................ H01H 13/023 |
| | | | 200/314 |
| 2016/0151706 | A1 | 6/2016 | Antonio |
| 2017/0110920 | A1 | 4/2017 | Mao et al. |
| 2017/0151494 | A1 | 6/2017 | Ironmonger et al. |

FOREIGN PATENT DOCUMENTS

| | | |
|---|---|---|
| EP | 1 852 162 A1 | 11/2007 |
| EP | 2 172 252 A2 | 4/2010 |
| EP | 2 208 518 | 7/2010 |
| EP | 1 681 658 | 2/2014 |
| EP | 2 698 185 | 2/2014 |
| EP | 2 700 435 | 2/2014 |
| EP | 2 843 498 A1 | 3/2015 |
| EP | 2 870 985 A2 | 5/2015 |
| EP | 2 888 017 | 7/2015 |
| EP | 2 908 223 A1 | 8/2015 |
| EP | 2 908 224 | 8/2015 |
| EP | 2 963 522 A1 | 1/2016 |
| JP | 7-68052 | 3/1995 |
| JP | H11-53994 | 2/1999 |
| JP | 11-90042 | 4/1999 |
| JP | 2001-143556 | 5/2001 |
| JP | 2002-102537 | 4/2002 |
| JP | 2009-037582 | 2/2009 |
| JP | 2009-118185 | 5/2009 |
| JP | 2012-249923 | 12/2012 |
| JP | 2013-236910 | 11/2013 |
| JP | 2016-096677 A | 5/2016 |
| WO | WO 1999/036136 | 7/1999 |
| WO | 2012/125924 A2 | 9/2012 |
| WO | WO 2013/157052 | 10/2013 |
| WO | WO 2014/184120 | 11/2014 |
| WO | WO 2015/118082 | 8/2015 |
| WO | WO 2016/031028 | 3/2016 |

OTHER PUBLICATIONS

Office Action dated Aug. 28, 2017 issued in U.S. Appl. No. 15/647,315 to Suetake, filed Jul. 12, 2017 (35 pages).

Anonymous, "Nintendo Wii U Teardown", Nov. 19, 2012, XP055397223, Retrieved from the internet: URL:https://www.ifixit.com/Teardown/Nintendo+Wii+U+Teardown/11796 (17 pages).

European Search Report dated Aug. 18, 2017, issued in EP Application No. 17153683.2 (10 pages).

European Search Report dated Aug. 17, 2017, issued in EP Application No. 17153682.4 (7 pages).

European Search Report dated Aug. 24, 2017, issued in EP Application No. 17153692.3 (7 pages).

Extended European Search Report dated Sep. 27, 2017 issued in European Application No. 17153687.3 (10 pgs.).

Okamura et al., U.S. Appl. No. 15/422,854, filed Feb. 2, 2017 (78 pages).

Okamura, U.S. Appl. No. 15/422,775, filed Feb. 2, 2017 (121 pages).

Kaneko et al., U.S. Appl. No. 15/422,915, filed Feb. 2, 2017 (75 pages).

Tsuchiya, et al. U.S. Appl. No. 15/426,284, filed Feb. 7, 2017 (118 pages).

Office Action dated May 17, 2018 issued in U.S. Appl. No. 15/647,315 (45 pgs.).

European Search Report dated Feb. 27, 2018 issued in EP 16831611 (10 pages).

Suetake et al., U.S. Appl. No. 15/370,189, filed Dec. 6, 2016, 85 pages.

PharaohsVizier, White Knockoff Gamecube Controller Review, https://www.youtube.com/watch?v=h719aQqYYn4, p. 1 (Published on Sep. 14, 2010).

GametistaTV, Wii U Pro Controller Xbox 360 Stick Mod, https://www.youtube.com/watch?v=jsMcz4XPNWM, p. 1 (Published on Dec. 1, 2012).

Rai FX, How to take apart your Wii U Pro Controller, https://www.youtube.com/watch?v=Kgg45YISVQU, p. 1 (Published on Apr. 8, 2015).

Awgs, "I tried to disassemble and clean PS controller (DUALSHOCK emerald) for maintenance [awgs Foundry]," Awgs Foundry, Nov. 19, 2015, XP055515953, Retrieved on Oct. 16, 2018 from https://web.archive.org/web/20160606100733/http://awgsfoundry.com/blog-entry-264.html.

(56) References Cited

OTHER PUBLICATIONS

PS1/PS2 dual shock controller dissasembly/reassembly, Published May 6, 2017, [Video File]. Retrieved from https://www.youtube.com/watch?v=NkSb_U6m05Q.
Oct. 22, 2018 Communication pursuant to Article 94(3) EPC issued in European Application No. 17153687.3.
Extended European Search Report dated Jul. 14, 2017 issued in corresponding European Application No. 16204388.9 (8 pgs.).
Final Office Action dated Mar. 5, 2018, issued in U.S. Appl. No. 15/370,189 to Suetake et al., filed Dec. 6, 2016 (50 pages).

* cited by examiner

GAME CONTROLLER

CROSS REFERENCE TO RELATED APPLICATION

The disclosure of Japanese Patent Application No. 2016-116700, filed on Jun. 10, 2016, is incorporated herein by reference.

FIELD

The technology disclosed here relates to a game controller.

BACKGROUND AND SUMMARY

Conventionally, there is a controller including a button that emits light. For example, in a conventional controller, a luminous body is provided below a light transmissive or light semi-transmissive button, and the luminous body is caused to emit light, whereby the button emits light.

However, in a conventional technique, there is room for improvement in the structure of a button that emits light.

Therefore, it is an object of an exemplary embodiment to provide a game controller including a button that emits light.

To achieve the above object, the exemplary embodiment employs the following configurations.

An example of the exemplary embodiment is a game controller including: a housing including an aperture portion; a key top of an operation button exposed through the aperture portion and configured to be pressed with a finger of a user; a light-emitting section; a tubular light-guiding portion configured to guide light from the light-emitting section and surrounding an outer periphery of the key top; a light-shielding portion surrounding an outer periphery of the light-guiding portion; and a switch placed below the key top, wherein an upper surface of the key top and an upper surface of the light-guiding portion are exposed through the aperture portion.

Based on the above, a light-guiding portion is exposed through an aperture portion of a housing, and the light-guiding portion is surrounded by a light-shielding portion. Consequently, it is possible to guide light to a surface of the housing such that light does not come out of the light-guiding portion, and it is possible to cause an operation button to emit light, for example, in a ring-shaped manner.

It should be noted that the light-shielding portion includes a member formed of a light-shielding material, and a member obtained by applying a light-shielding agent to the outer periphery of the light-guiding portion.

Further, in another configuration, the switch is placed below a center of the key top.

According to the above configuration, a switch is provided below a key top. Thus, it is possible to simplify the structure of a button.

Further, in another configuration, the game controller may further include an elastic portion placed below the key top and configured to bias the key top in a direction opposite to a pressing direction. When the key top is pressed, the key top may come into contact with the switch through the elastic portion.

According to the above configuration, it is possible to push up a key top with a simple structure.

Further, in another configuration, the elastic portion may be formed of a light-guiding material. The light-emitting section may be placed below the elastic portion and at a position where the light-emitting section overlaps the elastic portion.

According to the above configuration, even if an elastic portion is placed at a position where the elastic portion overlaps a light-emitting section, it is possible to transmit light from the light-emitting section and cause the light to be incident on the light-guiding portion.

Further, in another configuration, the light-shielding portion may be tubular.

According to the above configuration, it is possible to cover a tubular light-guiding portion with a tubular light-shielding portion.

Further, in another configuration, the light-emitting section may be placed inside a region surrounded by the light-shielding portion.

According to the above configuration, it is possible to prevent light from the light-emitting section from coming out of the light-shielding portion.

Further, in another configuration, as the light-emitting section, a plurality of light-emitting sections may be provided.

According to the above configuration, it is possible to cause the light-guiding portion to emit light by eliminating the unevenness of light.

Further, in another configuration, as the light-emitting section, a plurality of light-emitting sections may be placed at positions symmetrical with respect to a center of the key top.

According to the above configuration, light-emitting sections are placed at positions symmetrical with respect to a key top. Thus, it is possible to cause the light-guiding portion to uniformly emit light by eliminating the evenness of light.

Further, in another configuration, the light-shielding portion may not be exposed through a surface of the housing.

According to the above configuration, it is possible to make the light-shielding portion inconspicuous.

Further, in another configuration, even when the key top is pressed, the light-guiding portion may not be pressed in a direction of pressing the key top.

According to the above configuration, it is possible to provide an operation button in which only a key top is pressed, and a light-guiding portion that is around the operation button and emits light is not pressed.

Further, in another configuration, the switch and the light-emitting section may be placed on a substrate provided in the housing.

According to the above configuration, it is possible to reduce the number of components.

Further, in another configuration, an upper surface of the light-guiding portion may have substantially the same height as a surface of the housing.

Further, in another configuration, an upper surface of the key top may have substantially the same height as a surface of the housing.

According to the above configurations, it is possible to make the operation button and the surface of the housing approximately flat.

Further, in another configuration, the operation button may be a home button.

According to the above configuration, it is possible to cause a home button to emit light. For example, the home button is used to perform an operation different from a normal game operation (e.g., display a menu screen), and it is possible to cause a portion around such a home button to emit light.

According to the exemplary embodiment, it is possible to cause a portion around an operation button of a game controller to emit light.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
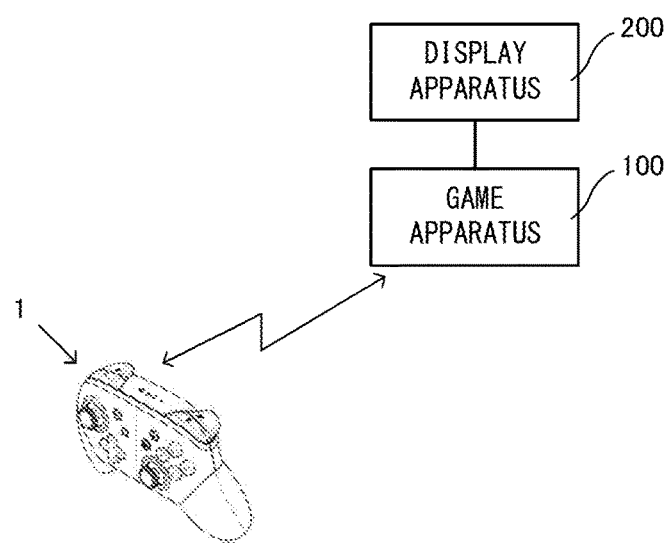
FIG. 1 is a diagram showing a non-limiting example of a game system including a game controller 1 according to the exemplary embodiment.

With reference to the drawings, a game controller 1 according to an exemplary embodiment is described below. FIG. 1 is a diagram showing an example of a game system including the game controller 1 according to the exemplary embodiment.

As shown in FIG. 1, the game system includes the game controller 1, a game apparatus 100, and a display apparatus 200. The game apparatus 100 includes a CPU, a RAM, and a storage device (a non-volatile memory, an optical disc, a magnetic disk, or the like) (not shown). The CPU of the game apparatus 100 can execute game processing based on a predetermined game program, and outputs the result of the game processing to the display apparatus 200. As the display apparatus 200, for example, a liquid crystal display apparatus or an organic EL display apparatus may be used. It should be noted that the game apparatus 100 may be a stationary game apparatus, or may be a mobile game apparatus integrated with the display apparatus 200. Further, the game apparatus 100 is not limited to an apparatus designed for games, and may be an information processing apparatus capable of executing any program for a personal computer, a smartphone, or the like other than a game program.

The game apparatus 100 and the game controller 1 are connected together in a wired or wireless manner, and operation data corresponding to an operation performed on the game controller 1 is output to the game apparatus 100. For example, the game controller 1 and the game apparatus 100 may be connected together using Bluetooth (registered trademark).

Figure 2:
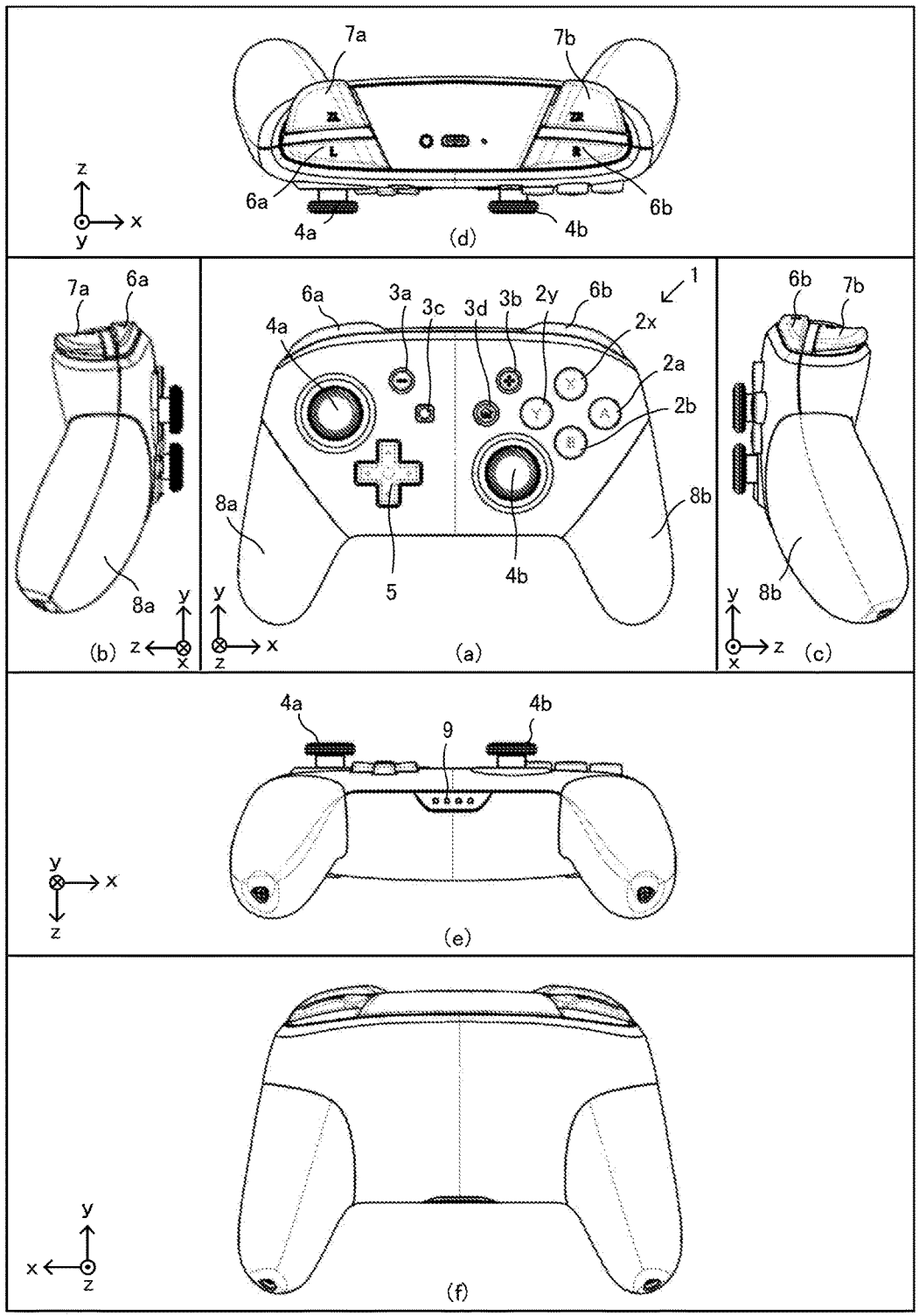
FIG. 2 is an external view of a non-limiting example of the game controller 1.

The details of the game controller 1 are described below. FIG. 2 is an external view of the game controller 1. (a) of FIG. 2 is a front view of the game controller 1. (b) of FIG. 2 is a left side view of the game controller 1. (c) of FIG. 2 is a right side view of the game controller 1. (d) of FIG. 2 is a top view of the game controller 1. (e) of FIG. 2 is a bottom view of the game controller 1. (f) of FIG. 2 is a rear view of the game controller 1. An xyz coordinate system in FIG. 2 is a coordinate system with respect to the game controller 1 and is defined such that a direction perpendicular to a front surface of the game controller 1 (e.g., a direction of pressing an A-button 2a) is a z-axis direction, a left-right direction of the game controller 1 (e.g., a direction connecting the A-button 2a and a Y-button 2y) is an x-axis direction, and an up-down direction of the game controller 1 (e.g., a direction connecting a B-button 2b and an X-button 2x) is a y-axis direction.

As shown in (a) of FIG. 2, in a right region of the front surface of the game controller 1, an A-button 2a, a B-button 2b, an X-button 2x, and a Y-button 2y are placed. Further, on the right side in a center region of the front surface of the game controller 1, a plus button 3b and a home button 3d are placed. Further, below the Y-button 2y and the home button 3d, a right analog stick 4b is placed.

Further, on the left side in the center region of the front surface of the game controller 1, a minus button 3a and a capture button 3c are placed. Further, in a left region of the front surface of the game controller 1, a left analog stick 4a is placed. Further, below the minus button 3a and the capture button 3c, a directional pad 5 is placed.

The A-button 2a, the B-button 2b, the X-button 2x, and the Y-button 2y are buttons capable of being pressed in a depth direction (a positive z-axis direction) in (a) of FIG. 2 and are buttons used for a game operation. Further, the minus button 3a, the plus button 3b, the capture button 3c, and the home button 3d are buttons capable of being pressed in the positive z-axis direction. The home button 3d may be used for, for example, an operation different from a game operation. If the home button 3d is pressed, a menu screen or a setting screen of the game apparatus 100 may be displayed. For example, a user can press the home button 3d at any timing while the game apparatus 100 is executing a game program. If the home button 3d is pressed while a game program is being executed, the game program that is being executed is interrupted, and a predetermined menu screen is displayed. Further, by the pressing of the home button 3d, an on state and an off state of a power supply of the game apparatus 100 or an on state and an off state of the sleep of the game apparatus 100 may be controlled. The capture button 3c is a button used to capture, for example, an image displayed on the display apparatus 200. The capture button 3c and the home button 3d are buttons that are not used for a normal game operation and therefore are used less frequently than other buttons for a game operation (the A-button 2a, the B-button 2b, the X-button 2x, the Y-button 2y, an L-button 6a, an R-button 6b, a ZL-button 7a, a ZR-button 7b, and the like) during a game. It should be noted that the details of the structure of the home button 3d will be described later.

Further, the left analog stick 4a and the right analog stick 4b are devices for indicating a direction and are each configured such that a stick portion operated by the finger of the user can be tilted in any directions (at any angles in up, down, left, right, and oblique directions). It should be noted that the left analog stick 4a and the right analog stick 4b may be able to be pressed in the positive z-axis direction. The directional pad 5 is a device for indicating the up, down, left, and right directions.

It should be noted that the positions of the left analog stick 4a, the directional pad 5, the right analog stick 4b, the A-button 2a, the B-button 2b, the X-button 2x, and the Y-button 2y are not limited to those shown in FIG. 2. For example, the left analog stick 4a may be provided at the position of the directional pad 5 shown in FIG. 2, and the directional pad 5 may be provided at the position of the left analog stick 4a shown in FIG. 2. Further, the right analog stick 4b may be provided at the positions of the A, B, X, and Y-buttons shown in FIG. 2, and the A, B, X, and Y-buttons may be provided at the position of the right analog stick 4b shown in FIG. 2.

Further, the directional pad 5 may not be configured as an integrated key top, and may be configured as independent four buttons. That is, a button corresponding to the up direction of the directional pad 5, a button corresponding to the right direction of the directional pad 5, a button corresponding to the down direction of the directional pad 5, and a button corresponding to the left direction of the directional pad 5 may be provided as independent buttons.

The key tops of the left analog stick 4a and the right analog stick 4b are the same in shape, size, and material. The left analog stick 4a and the right analog stick 4b, however, are different in the weight of tilting the analog stick (the magnitude of the force required to tilt the analog stick at the same angle). Specifically, within each of the left analog stick 4a and the right analog stick 4b, an elastic member (a spring) is provided, and the key top is configured such that when the key top is tilted, the key top returns to the previous position by the restoring force of the elastic member. The characteristics (the spring constants) of these elastic members provided within the analog sticks are different, whereby the left analog stick 4a and the right analog stick 4b are different in weight.

Specifically, the left analog stick 4a is lighter than the right analog stick 4b. Although depending on the game program executed by the game apparatus 100, for example, the left analog stick 4a is used for the operation of moving a game character. On the other hand, the right analog stick 4b is used to move a virtual camera or move a target for the user to take aim. In a case where an object is moved using an analog stick, and if the analog stick is too light, the analog stick is greatly tilted by a small force. Thus, the user cannot move the object as intended. Thus, the right analog stick 4b is heavier than the left analog stick 4a, whereby, for example, in a case where the virtual camera is moved using the right analog stick 4b, it is possible to move the virtual camera more finely and improve the operability.

It should be noted that the left analog stick 4a and the right analog stick 4b may be the same in weight. Alternatively, the right analog stick 4b may be lighter than the left analog stick 4a. Yet alternatively, the left analog stick 4a and the right analog stick 4b may be different in shape, size, and material.

It should be noted that to vary the operational feelings of the left analog stick 4a and the right analog stick 4b, other than the weights of the left analog stick 4a and the right analog stick 4b, the left analog stick 4a and the right analog stick 4b may be configured as follows. For example, the left analog stick 4a and the right analog stick 4b may be different in the tilting range (the movable range) of the key top. Alternatively, the left analog stick 4a and the right analog stick 4b may be different in sensitivity (resolution). For example, the tilting range of the right analog stick 4b is greater than that of the left analog stick 4a, whereby it is possible to perform a more precise operation when moving the virtual camera or the target. Further, the sensitivity of the right analog stick 4b is lower than the left analog stick 4a, whereby it is possible to perform a precise operation. Thus, it is possible to prevent an unintended input. Conversely to the above, the tilting range of the left analog stick 4a may be greater than that of the right analog stick 4b. Alternatively, the sensitivity of the left analog stick 4a may be lower than that of the right analog stick 4b. Further, the left analog stick 4a and the right analog stick 4b may be different in any one, or two or more, of "weight", "tilting range", and "sensitivity".

Figure 3:
FIG. 3 is a diagram showing a non-limiting example of a top surface portion of each of a left analog stick 4a and a right analog stick 4b.

FIG. 3 is a diagram showing an example of a top surface portion of each of the left analog stick 4a and the right analog stick 4b. FIG. 3 is a side view of the top surface portion (a portion to be touched by the user) of the analog stick 4a or 4b. As shown in FIG. 3, a top surface of each of the left analog stick 4a and the right analog stick 4b has a recessed portion in its center. The recessed portion is circular when the analog stick is viewed from above. The recessed portion is so shaped as to slightly swell upward. The height of the highest portion of the recessed portion is approximately the same as the height of the highest portion of an outer periphery of the recessed portion. Further, on a side surface of the top surface portion of each of the left analog stick 4a and the right analog stick 4b, a plurality of ribs (recesses and protrusions) that go around the top surface are formed in a concentric circle. This makes the finger of the user likely to be caught on the side surface of the top surface portion of the analog stick. That is, when the analog stick is tilted in any direction, the finger of the user is less likely to slide. This improves the operability. Further, in a center portion of the top surface of the analog stick, a rib is not provided, thereby improving the feel when the finger of the user operates the analog stick.

Further, as shown in (e) of FIG. 2, four LEDs 9 are provided on a lower surface of the game controller 1. If a plurality of game controllers 1 are connected to the game apparatus 100, the LEDs 9 emit light so that each game controller 1 can be identified by the user. For example, if four game controllers 1 are connected to the game apparatus 100, then in a first game controller 1, only the first one from the left among the four LEDs 9 emits light. In a second game controller 1, only the second one from the left among the four LEDs 9 emits light. In a third game controller 1, only the third one from the left among the four LEDs 9 emits light. In a fourth game controller 1, only the fourth one from the left among the four LEDs 9 emits light. It should be noted that each of a plurality of game controllers may be distinguished by the number of beams of light emitted by the four LEDs 9.

As shown in FIG. 2, to the left and right of the center of the game controller 1, grip portions 8a and 8b, which protrude downward (in a negative y-axis direction), are provided, respectively. The grip portion 8a is held by the left hand of the user. The grip portion 8b is held by the right hand of the user. As shown in (b) and (c) of FIG. 2, the grip portions 8a and 8b are formed so as to be curved in the direction of a back surface of the game controller 1 (the positive z-axis direction).

Further, as shown in (d) of FIG. 2, on an upper surface of the game controller 1, an L-button 6a, a ZL-button 7a, an R-button 6b, and a ZR-button 7b are provided. Specifically, the L-button 6a is provided in a left end portion on the upper surface of the game controller 1. The ZL-button 7a is provided to the side of the L-button 6a closer to the back surface of the game controller 1 (further in the positive z-axis direction). Further, the R-button 6b is provided in a right end portion on the upper surface of the game controller 1. The ZR-button 7b is provided to the side of the R-button 6b closer to the back surface of the game controller 1 (further in the positive z-axis direction).

The L-button 6a, the R-button 6b, the ZL-button 7a, and the ZR-button 7b are buttons used for a game operation. The ZL-button 7a and the ZR-button 7b may be trigger buttons.

Further, each of the buttons (A, B, X, Y, L, R, ZL, and ZR-buttons) in the exemplary embodiment is a button capable of outputting a signal (an ON/OFF signal) indicating whether or not the button is pressed. Alternatively, in another exemplary embodiment, each of the ZL-button 7a and the ZR-button 7b may be a button capable of outputting an analog value corresponding to the amount of pressing of the button. For example, if the user pushes down the ZL-button 7a or the ZR-button 7b to a first position, an analog value corresponding to the first position may be output. If the user pushes down the button to a second position below the first position, an analog value corresponding to the second position may be output.

Figure 4:
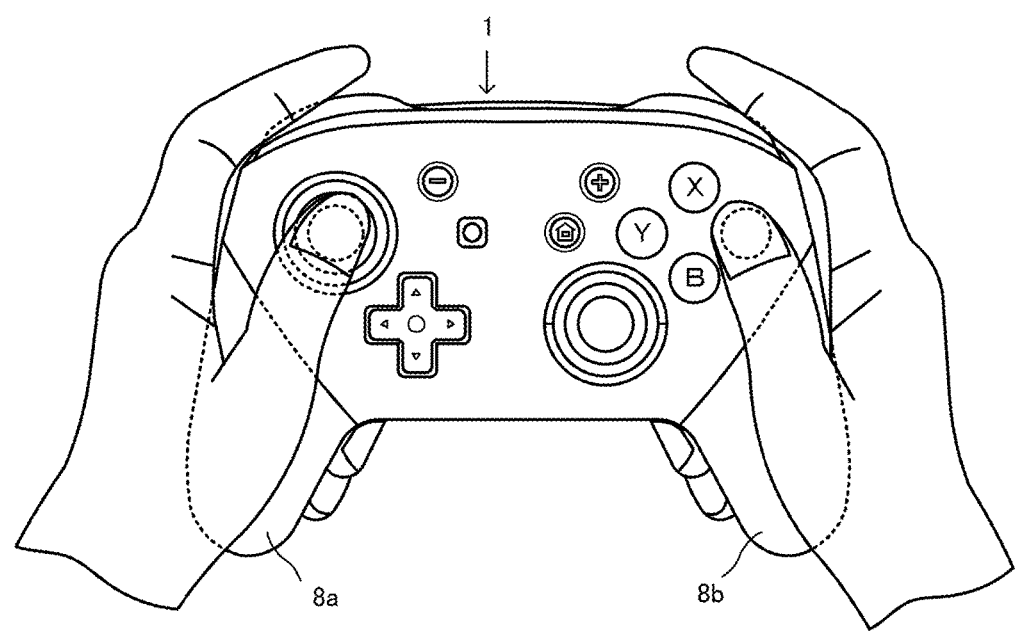
FIG. 4 is a diagram showing a non-limiting example of the state where a user holds the game controller 1 with both hands.

FIG. 4 is a diagram showing the state where the user holds the game controller 1 with both hands. As shown in FIG. 4, if the user holds the grip portion 8a with their left hand and holds the grip portion 8b with their right hand, the user can operate the left analog stick 4a and the directional pad 5 with the thumb of the left hand. Further, the user can operate the minus button 3a and the capture button 3c with the thumb of the left hand. Further, the user can operate the L-button 6a and the ZL-button 7a with the index finger (or the middle finger) of the left hand. Further, the user can operate the A-button 2a, the B-button 2b, the X-button 2x, the Y-button 2y, the right analog stick 4b, the plus button 3b, and the home button 3d with the thumb of the right hand. Further, the user can operate the R-button 6b and the ZR-button 7b with the index finger (or the middle finger) of the right hand. It should be noted that FIG. 4 shows the typical manner of holding the game controller 1. Depending on the user, the game controller 1 may be held in a different manner of holding the game controller 1.

[Details of L/R Button and ZL/ZR Button]

Next, a description is given of the details of the L-button 6a, the ZL-button 7a, the R-button 6b, and the ZR-button 7b, which are provided on the upper surface of the game controller 1.

Figure 5:
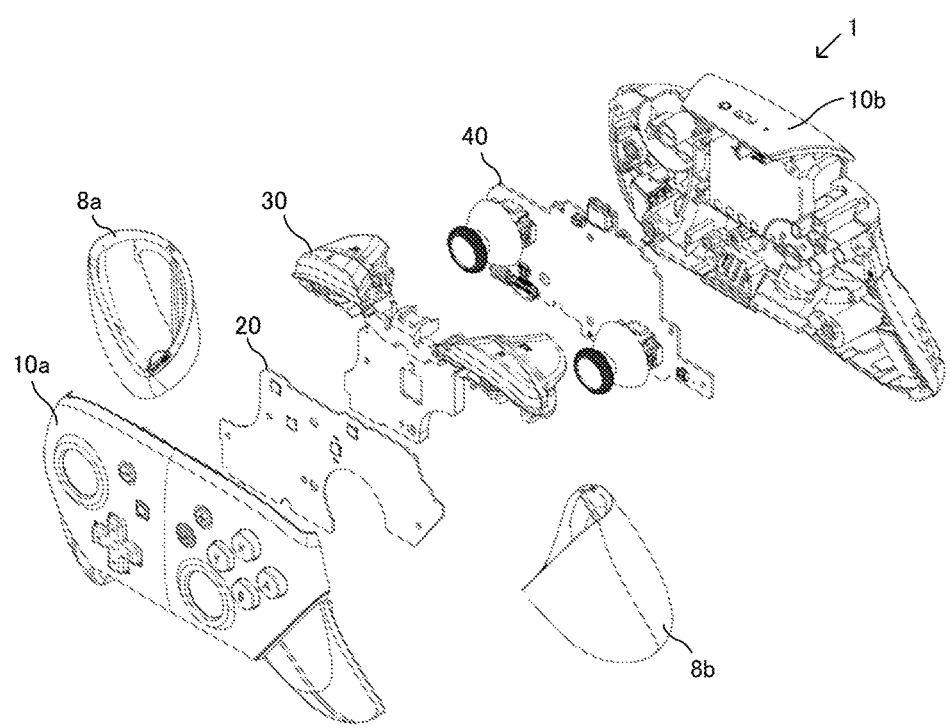
FIG. 5 is an exploded perspective view of a non-limiting example of the game controller 1.

FIG. 5 is an exploded perspective view of the game controller 1. As shown in FIG. 5, a housing 10 of the game controller 1 is formed by connecting a first housing 10a on the front surface side of the game controller 1 and a second housing 10b on the back surface side of the game controller 1. Within the housing 10, a button frame 30 is accommodated. Further, within the housing 10, a first substrate 20 and a second substrate 40 are accommodated.

Figure 6:
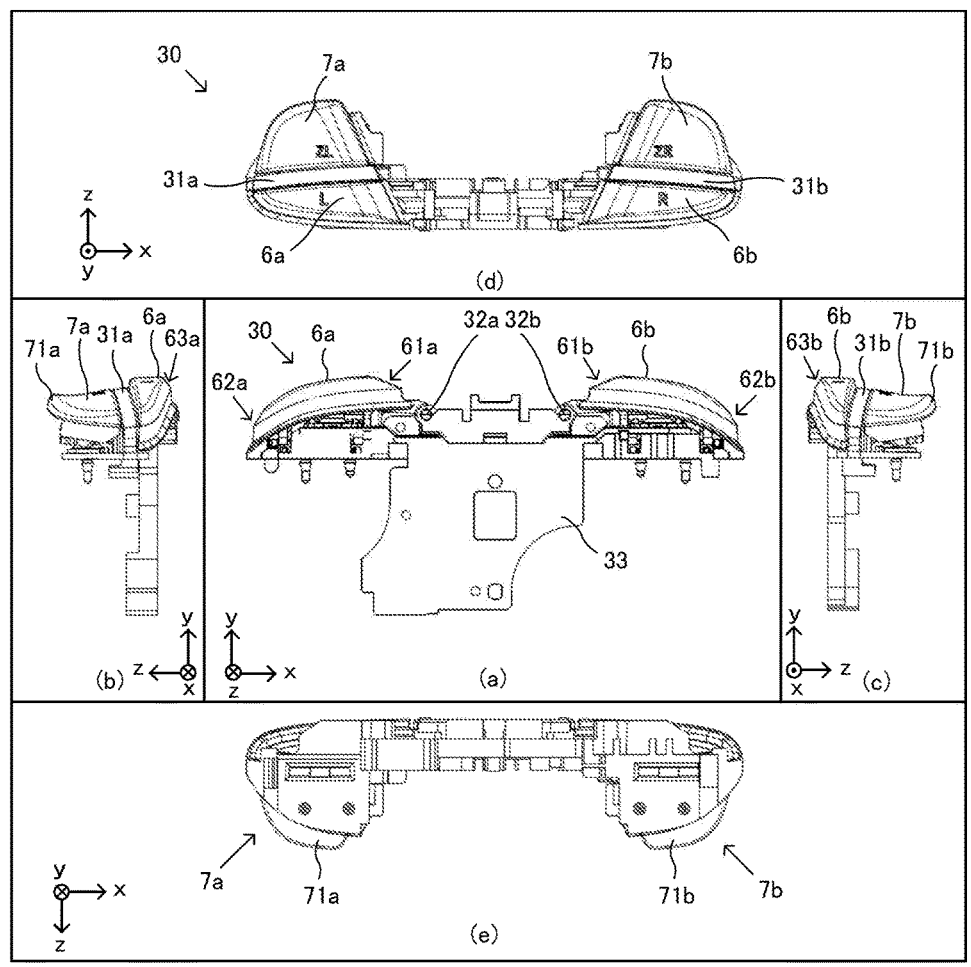
FIG. 6 is an external view of a non-limiting example of a button frame 30.

FIG. 6 is an external view of the button frame 30. (a) of FIG. 6 is a front view of the button frame 30 (a diagram showing the button frame 30 as viewed from the front of the game controller 1). (b) of FIG. 6 is a left side view of the button frame 30. (c) of FIG. 6 is a right side view of the button frame 30. (d) of FIG. 6 is a top view of the button frame 30. (e) of FIG. 6 is a bottom view of the button frame 30. It should be noted that an x-axis, a y-axis, and a z-axis in FIG. 6 correspond to the x-axis, the y-axis, and the z-axis, respectively, in FIG. 2.

Figure 7:
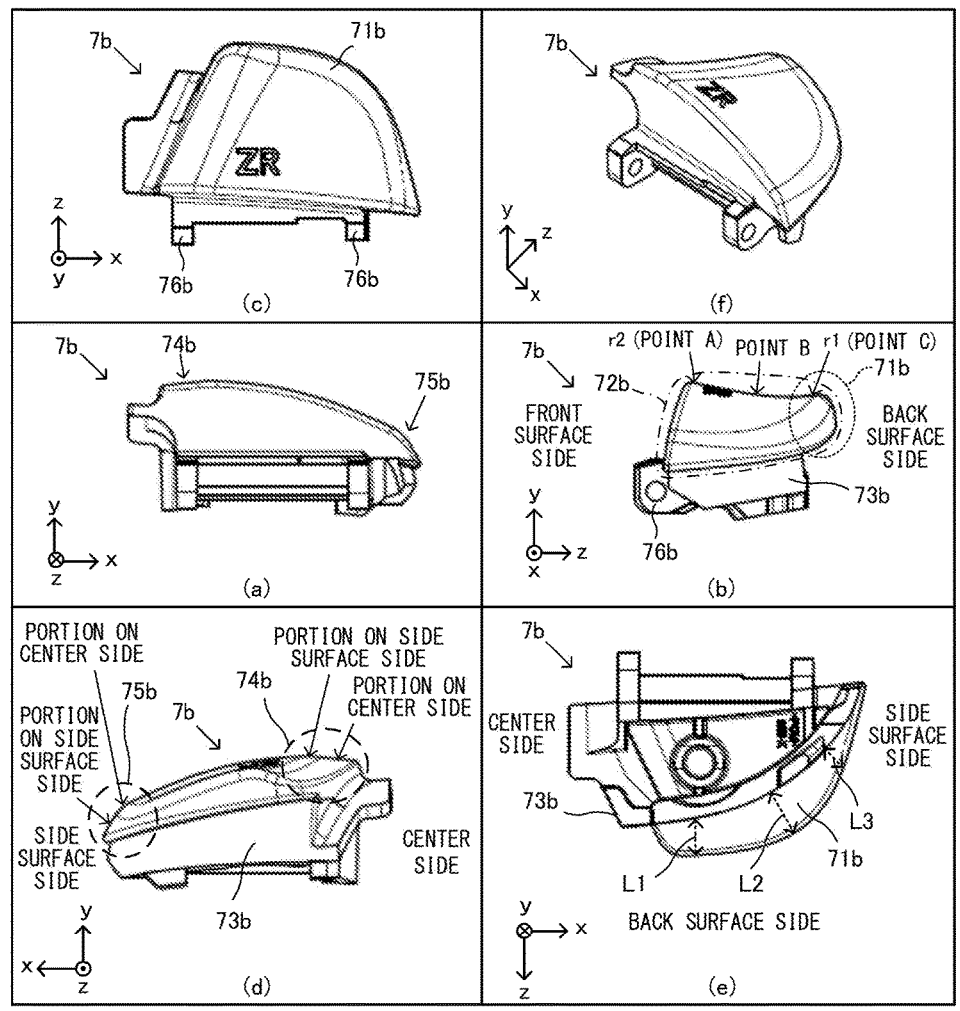
FIG. 7 is an external view of a non-limiting example of a key top of a ZR-button 7b.

FIG. 7 is an external view of the key top of the ZR-button 7b. (a) of FIG. 7 is a front view of the key top of the ZR-button 7b (a diagram showing the key top of the ZR-button 7b as viewed from the front of the game controller 1). (b) of FIG. 7 is a right side view of the key top of the ZR-button 7b. (c) of FIG. 7 is a top view of the key top of the ZR-button 7b. (d) of FIG. 7 is a rear view of the key top of the ZR-button 7b. (e) of FIG. 7 is a bottom view of the key top of the ZR-button 7b. (f) of FIG. 7 is a perspective view of the key top of the ZR-button 7b. It should be noted that an x-axis, a y-axis, and a z-axis in FIG. 7 correspond to the x-axis, the y-axis, and the z-axis, respectively, in FIG. 2.

It should be noted that the ZL-button 7a and the ZR-button 7b are symmetrical, and the ZL-button 7a and the ZR-button 7b have the same shape. Further, the L-button 6a and the R-button 6b are symmetrical, and the L-button 6a and the R-button 6b have the same shape. Hereinafter, although only either one of the ZL-button 7a and the ZR-button 7b will be described, the same applies to the other button. Further, although only either one of the L-button 6a and the R-button 6b will be described, the same applies to the other button. Further, hereinafter, the L-button 6a and the R-button 6b will occasionally be collectively referred to as an "L/R button 6", and the ZL-button 7a and the ZR-button 7b will occasionally be collectively referred to as a "ZL/ZR button 7".

As shown in FIG. 6, the L-button 6a, the R-button 6b, the ZL-button 7a, and the ZR-button 7b are formed integrally with a frame portion 33, which is accommodated within the housing 10. Further, as will be described later, a button detection section for each button is also formed integrally. If the button frame 30 is accommodated in the housing 10, the L-button 6a, the R-button 6b, the ZL-button 7a, and the ZR-button 7b are exposed through an upper surface of the housing 10.

(Description of L/R Button)

As shown in (d) of FIG. 6, the R-button 6b is so shaped as to be horizontally long (is so shaped as to be long in the x-axis direction). That is, the R-button 6b is formed such that the length of the R-button 6b in the direction of the side surface of the game controller 1 is longer than the length of the R-button 6b in the direction of the back surface of the game controller 1. Further, the further in the direction of the side surface (the further in a positive x-axis direction) from the center of the game controller 1, the smaller the width of the R-button 6b.

Further, as shown in (a) of FIG. 6, the further in the direction of the side surface from the center in the left-right direction of the game controller 1, the further downward the R-button 6b slopes overall.

Figure 8A:
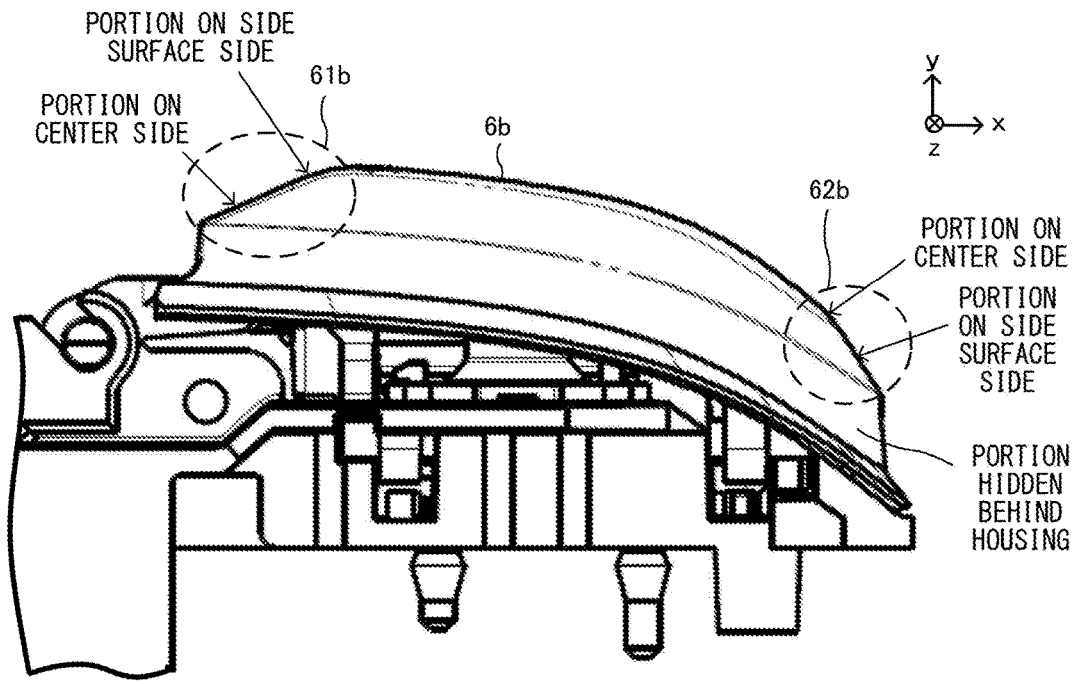
FIG. 8A is a partially enlarged view of a non-limiting example of an R-button 6b as viewed from its front.
Figure 8B:
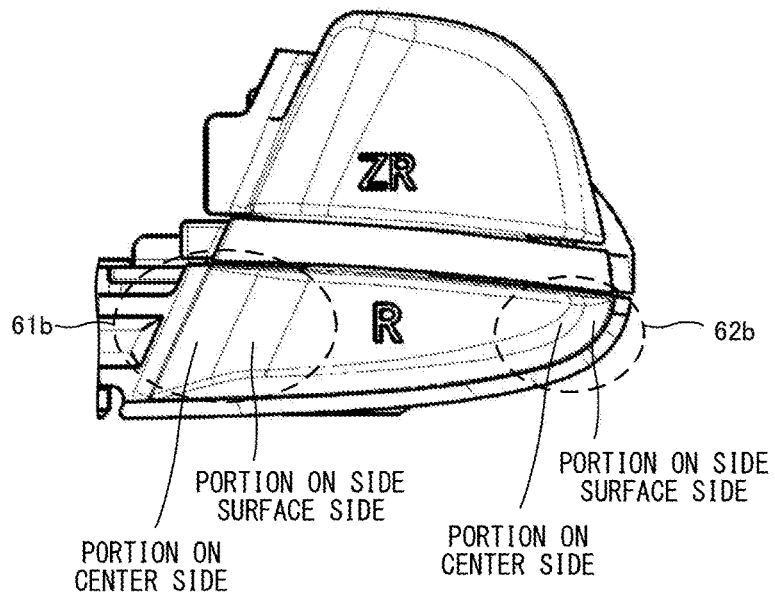
FIG. 8B is a partially enlarged view of a non-limiting example of the R-button 6b as viewed from its upper surface.
Figure 8C:
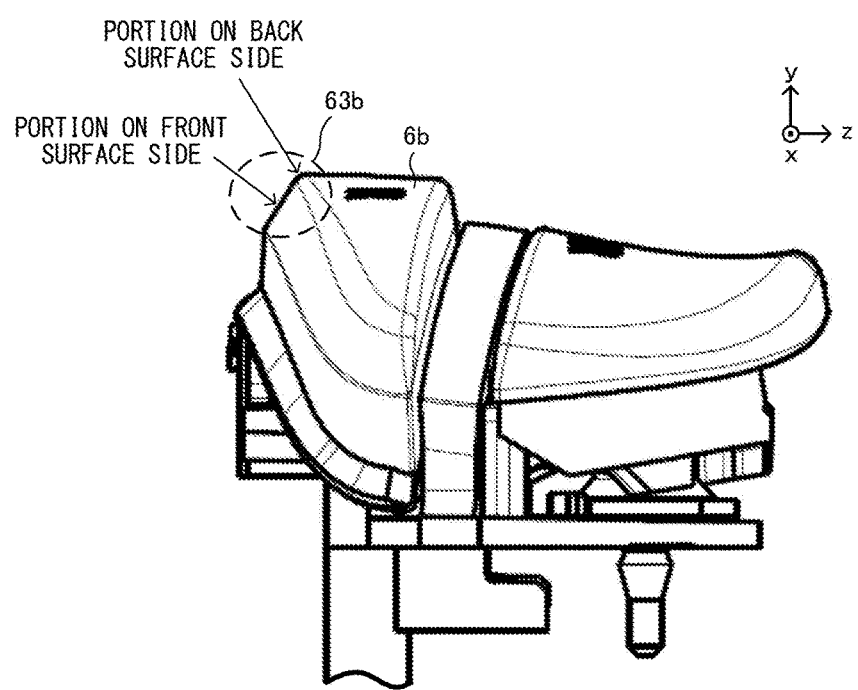
FIG. 8C is a partially enlarged view of a non-limiting example of the R-button 6b as viewed from its right side surface.

Specifically, as shown in (a) of FIG. 6, in an end portion of the R-button 6b on the center side in the left-right direction of the game controller 1 (further in a negative x-axis direction), a sloping portion 61b, which slopes downward, is provided. FIG. 8A is a partially enlarged view of the R-button 6b as viewed from its front. FIG. 8B is a partially enlarged view of the R-button 6b as viewed from its upper surface. FIG. 8C is a partially enlarged view of the R-button 6b as viewed from its right side surface.

More specifically, as shown in FIGS. 8A and 8B, the sloping portion 61 in the end portion of the R-button 6b on the center side of the game controller 1 slopes in two steps. A portion of the R-button 6b close to the end portion on the center side of the game controller 1 has a greater sloping angle. That is, the sloping portion 61b of the R-button 6b includes a portion on the side surface side and a portion on the center side. With respect to the horizontal direction (the x-axis direction in the xyz coordinate system), the sloping angle of the portion on the center side is greater than the sloping angle of the portion on the side surface side.

Further, as shown in (a) of FIG. 6, in an end portion of the R-button 6b on the side surface side in the left-right direction of the game controller 1 (further in the positive x-axis direction), a sloping portion 62b, which slopes downward, is provided.

Specifically, as shown in FIGS. 8A and 8B, the end portion of the R-button 6b on the side surface side of the game controller 1 slopes in two steps. A portion of the R-button 6b close to the end portion on the side surface side of the game controller 1 has a greater sloping angle. That is, the sloping portion 62b of the R-button 6b includes a portion on the side surface side and a portion on the center side. With respect to the horizontal direction (the x-axis direction in the xyz coordinate system), the sloping angle of the portion on the side surface side is greater than the sloping angle of the portion on the center side.

Further, as shown in (c) of FIG. 6, in an end portion of the R-button 6b on the front surface side of the game controller 1 (further in a negative z-axis direction), a sloping portion 63b, which slopes downward, is provided.

Specifically, as shown in FIG. 8C, the sloping portion 63b in the end portion of the R-button 6b on the front surface side of the game controller 1 slopes in two steps. A portion of the R-button 6b close to the end portion on the front surface side of the game controller 1 has a greater sloping angle. That is, the sloping portion 63b of the R-button 6b includes a portion on the front surface side and a portion on the back surface side. With respect to the horizontal direction (the z-axis direction in the xyz coordinate system), the sloping angle of the portion on the front surface side is greater than the sloping angle of the portion on the back surface side.

As described above, the sloping portion 61b is provided in the R-button 6b on the center side of the game controller 1, whereby it is easy for even a person having a long finger to operate the R-button 6b. That is, if the finger of the user is long, and when the user operates the R-button 6b, the tip of the finger reaches the end portion of the R-button 6b on the center side of the game controller 1. The sloping portion 61b, however, is provided in the end portion on the center side, whereby the sloping portion 61b fits the finger, and it is easy for the user to operate the R-button 6b.

Further, the sloping portion 62b is provided in the end portion of the R-button 6b on the side surface side of the game controller 1, whereby it is easy for both a person having a long finger and a person having a short finger to operate the R-button 6b. That is, a user having a short finger can operate the R-button 6b by placing the tip of the finger on the end portion of the R-button 6b on the side surface side of the game controller 1. On the other hand, when a user having a long finger operates the R-button 6b, the extremity of the index finger hits the end portion of the R-button 6b on the center side, and a portion near the base or the second joint of the finger hits the end portion of the R-button 6b on the side surface side. The sloping portion 62b is provided in the end portion on the side surface side, whereby, when the end portion of the R-button 6b on the center side is pressed by the extremity of the index finger, it is possible to make small a force (a force by reaction) applied to the portion near the base or the second joint of the finger, and make it easy for the user to press the R-button 6b.

Further, the sloping portion 63b is provided in the end portion of the R-button 6b on the front surface side of the game controller 1, whereby it is easy for the user to operate the R-button 6b. For example, there is a user who holds the game controller 1 by covering the front surface of the game controller 1 with their hand, without holding the grip portion 8 with both hands as in FIG. 4. The sloping portion 63b is provided in the R-button 6b, whereby it is also easy for such a user to operate the R-button 6b and the ZR-button 7b. Specifically, such a user does not access the L/R button 6 and the ZL/ZR button 7 with their finger (the index finger and/or the middle finger) from the side surface side of the housing 10, and accesses the L/R button 6 and the ZL/ZR button 7 with their finger from the front surface side of the housing 10. Here, if the sloping portion 63 (a, b) is not provided in the end portion of the L/R button 6 on the front surface side, the finger hits the corner of the L/R button 6 on the front surface side. This makes it difficult for the user to operate the L/R button 6. Further, when such a user operates the ZL/ZR button 7 on the back surface side, the finger may hit the corner of the L/R button 6 on the front surface side and erroneously press the L/R button 6. In the exemplary embodiment, the sloping portion 63 is provided in the L/R button 6 on the front surface side. Thus, even if the user holds the game controller 1 by covering the front surface of the game controller 1 with their hand, it is easy to operate the L/R button 6 and the ZL/ZR button 7. Thus, it is possible to prevent the user from erroneously pressing the L/R button 6 when operating the ZL/ZR button 7.

Further, as shown in (a) of FIG. 6, the L-button 6a and the R-button 6b are configured to be pivotable using as pivot points a shaft 32a and a shaft 32b, respectively, which are placed on the center side of the button frame 30. The shaft 32a and the shaft 32b are placed so as to extend in the z-axis direction (the direction of the back surface of the game controller 1). The L-button 6a extends from the shaft 32a in the direction of the side surface of the game controller 1 (the negative x-axis direction). The R-button 6b extends from the shaft 32b in the direction of the side surface of the game controller 1 (the positive x-axis direction). The L-button 6a and the R-button 6b are configured to pivot using as pivot points the shaft 32a and the shaft 32b, respectively, thereby being pressed downward in the game controller 1 (in the negative y-axis direction).

As described above, the L-button 6a and the R-button 6b pivot using as pivot points the shaft 32a and the shaft 32b, respectively, which are placed on the center side of the game controller 1, slope overall in the direction of the side surfaces, and include the above sloping portions 61 (a, b) and 62 (a, b). Thus, it is easy for the user to operate the L-button 6a and the R-button 6b. For example, in the case of a user having a long finger, the extremity of the index finger is placed on the sloping portion 61b on the center side, and the index finger comes into contact with the R-button 6b, from the extremity to the base of the finger along a curve downward to the right of the R-button 6b. In this case, it is easy for the user to press the R-button 6b with the entirety of the index finger. Particularly, if the sloping portion 61b (see FIG. 8A) is pressed in a direction perpendicular to the sloping surface, the force of the pressing causes the R-button 6b to pivot using the shaft 32b as a pivot point. Thus, it is also easy for a user having a long finger to operate the R-button 6b. Further, in the case of a user having a short finger, for example, the extremity of the index finger is placed on the sloping portion 62b on the side surface side. In this case, it is easy for the user to press the R-button 6b with the extremity of the index finger. Particularly, if the sloping portion 62b (see FIG. 8A) is pressed in the direction perpendicular to the sloping surface, the force of the pressing causes the R-button 6b to pivot using the shaft 32b as a pivot point. Thus, it is also easy for a user having a short finger to operate the R-button 6b.

(Description of ZR/ZL-Button)

Next, the ZR/ZL-button is described. As shown in FIG. 6, the ZL-button 7a is placed to the side of the L-button 6a closer to the back surface of the game controller 1. Further, the ZR-button 7b is placed to the side of the R-button 6b closer to the back surface of the game controller 1. The ZL-button 7a and the ZR-button 7b are so shaped as to be horizontally long (are so shaped as to be long in the x-axis direction). That is, the ZL-button 7a and the ZR-button 7b are each formed such that the length of the button in the direction of the side surface of the game controller 1 is longer than the length of the button in the direction of the back surface of the game controller 1.

As shown in FIG. 6, the ZR-button 7b includes a protruding portion 71b, which protrudes in the direction of the back surface of the game controller 1 (the positive z-axis direction) and the direction of the side surface of the game controller 1 (the positive x-axis direction: the right direction). Similarly, the ZL-button 7a includes a protruding portion 71a, which protrudes in the direction of the back surface of the game controller 1 (the positive z-axis direction) and the direction of the side surface of the game controller 1 (the negative x-axis direction: the left direction).

Specifically, as shown in (b) of FIG. 7, the ZR-button 7b includes an upper portion 72b, which includes the protruding portion 71b, and a lower portion 73b, which is below the upper portion 72b. The upper portion 72b of the ZR-button 7b is a portion with which the user comes into direct contact when pressing the button. If the ZR-button 7b is integrated with the button frame 30, and the button frame 30 is accommodated in the housing 10, the upper portion 72b of the ZR-button 7b is exposed to the outside, whereas the lower portion 73b of the ZR-button 7b is almost hidden behind the housing 10 (see FIG. 2). As shown in (e) of FIG. 7, the protruding portion 71b protrudes further in the positive z-axis direction (the direction of the back surface of the game controller 1) and the positive x-axis direction (the direction of the side surface of the game controller 1) than the outer edge of the upper end of the lower portion 73b.

More specifically, the protruding portion 71b extends continuously from the back surface side to the side surface side of the game controller 1. A portion of the protruding portion 71b extending from the back surface side to the side surface side of the game controller 1 (a portion in an oblique direction between the z-axis and the x-axis shown in (e) of FIG. 7) has a circular arc shape (a round shape). Further, as shown in (e) of FIG. 7, a protruding length L2 in the positive z-axis direction and the positive x-axis direction is longer than a protruding length L1 in the positive z-axis direction. That is, the protruding portion 71b is configured such that the length L2 in the oblique direction between the z-axis and the x-axis is longer than the length L1 in the direction along the z-axis. Further, the closer to the side surface, the smaller the degree of protrusion of the protruding portion 71b. Specifically, in (e) of FIG. 7, a length L3 is shorter than the length L2. In an end portion of a side surface of the ZR-button 7b, the protruding portion 71b slightly protrudes further than the lower portion 73b in the positive x-axis direction (the right direction).

As described above, the ZL-button 7a and the ZR-button 7b include the protruding portions 71 (a and b), which protrude in both the direction of the back surface and the direction of the side surface. This makes it possible to increase the areas of the upper surfaces of the key tops of the ZL-button 7a and the ZR-button 7b. Thus, it is easy for the user to operate the ZL-button 7a and the ZR-button 7b. If the entirety of the ZL-button 7a and the ZR-button 7b (the entirety of the buttons including the upper portion 72b and the lower portion 73b) is made large, the areas of the upper surfaces of the key tops of the ZL-button 7a and the ZR-button 7b can also be increased. However, the entirety of the buttons becomes large, and therefore, the housing 10 also becomes large. However, the protruding portions 71 are provided in the ZL-button 7a and the ZR-button 7b as in the exemplary embodiment, whereby it is possible to increase the areas of the upper surfaces of the key tops of the buttons without making the entirety of buttons large. Thus, it is possible to make the key tops of the ZL-button 7a and the ZR-button 7b large without making the entirety of the housing large, and therefore make it easy for the user to operate the ZL-button 7a and the ZR-button 7b.

In the exemplary embodiment, the ZL-button 7a and the ZR-button 7b protrude not only in the direction of the back surface but also in the direction of the side surface. Thus, it is easy for even a user having a short finger to operate the ZL-button 7a and the ZR-button 7b. That is, the ZL/ZR button 7 protrudes not only in the direction of the back surface but also in the direction of the side surface. Thus, the user can operate the ZL/ZR button 7 by placing their finger on, for example, a portion protruding in the direction of the side surface of the ZL/ZR button 7. For example, the ZR-button 7b protrudes in the direction of the side surface (the right direction). Thus, the user accesses the ZR-button 7b with the finger of their right hand from the right side surface of the game controller 1 and places the finger in the portion protruding in the direction of the side surface of the ZR-button 7b, and thereby can press the ZR-button 7b. In the ZR-button 7b, the protruding portion 71b, which protrudes in the direction of the right side surface, is provided. Thus, it is easy for even a user having a short finger to place their finger on the right side surface of the ZR-button 7b. Thus, the user can easily operate the ZR-button 7b. Further, the user can operate the ZL/ZR button 7 by placing their finger on, for example, the round-shaped portion between the ZL/ZR button 7 in the direction of the side surface and the direction of the back surface. This enables the user to operate the ZL/ZR button 7 without stretching their finger to a portion of the ZL/ZR button 7 on the center side (e.g., a portion protruding only in the direction of the back surface).

Further, the protruding portion 71 of the ZL/ZR button 7 extends continuously from the back surface side to the side surface side. The portion of the ZL/ZR button 7 from the back surface side to the side surface side has a round shape. Thus, there is less visual discomfort than in a case where the ZL/ZR button 7 includes a portion protruding only in the direction of the back surface and a portion protruding only in the direction of the side surface. This also improves the operability. In a case where the protruding portion 71 of the ZL/ZR button 7 is divided into a portion protruding only in the direction of the back surface and a portion protruding only in the direction of the side surface, and a portion from the back surface side to the side surface side does not protrude in the direction of the back surface and the direction of the side surface, the button has a discontinuous shape, which is unnatural. Further, in the case of a button having such a shape, the user operates the button by placing their finger on the portion protruding only in the direction of the back surface or the portion protruding only in the direction of the side surface. Thus, if the finger enters between these portions (between the direction of the back surface and the direction of the side surface), the user cannot operate the button. In contrast, the protruding portion 71 of the ZL/ZR button 7 is formed continuously from the back surface side to the side surface side, and the portion from the back surface side to the side surface side has a round shape, which results in a natural shape. Further, the game controller 1 according to the exemplary embodiment is so shaped as to be curved overall, and the round-shaped portion of the protruding portion 71 of the ZL/ZR button 7 matches the shape of the entirety of the game controller 1. Thus, there is no visual discomfort. Further, the protruding portion 71 of the ZL/ZR button 7 is formed continuously from the back surface side to the side surface side. Thus, the user can press the button at any position in this continuously formed portion. Thus, it is easy for the user to operate the ZL/ZR button 7.

Further, as shown in FIG. 7, an upper surface of the protruding portion 71b of the ZR-button 7b forms an integrated surface with an upper surface of a portion of the ZR-button 7b other than the protruding portion 71b. That is, an upper surface of the ZR-button 7b forms a surface continuous from the portion other than the protruding portion 71b (a portion that does not protrude in the direction of the back surface and the direction of the side surface) to the protruding portion 71b. The upper surface of the ZR-button 7b does not have a difference in level in the boundary between the protruding portion 71b and the portion other than the protruding portion 71b. Thus, there is no discomfort when the user operates the ZR-button 7b.

Further, as shown in (b) of FIG. 7, an end portion, in the direction of the back surface, of the protruding portion 71b has a round shape when viewed from the side surface side of the game controller 1. That is, a portion from the upper surface of the protruding portion 71b to a surface in the direction of the back surface has a round shape. As shown in (b) of FIG. 7, the ZR-button 7b is curved upward in the direction of the back surface. The ZR-button 7b, however, is not sharp in the end portion in the direction of the back surface, and has a round shape. Thus, even if the user presses the end portion, in the direction of the back surface, of the ZR-button 7b with their finger, there is no feeling of discomfort.

Further, as shown in (d) of FIG. 7, in an end portion of the ZR-button 7b on the center side in the left-right direction of the game controller 1 (further in the negative x-axis direction), a sloping portion 74b, which slopes downward, is provided. Specifically, the sloping portion 74b in the end portion of the ZR-button 7b on the center side of the game controller 1 slopes in two steps. A portion of the ZR-button 7b close to the end portion on the center side of the game controller 1 has a slightly great sloping angle. That is, the sloping portion 74b of the ZR-button 7b includes a portion on the side surface side and a portion on the center side. With respect to the horizontal direction (the x-axis direction in the xyz coordinate system), the sloping angle of the portion on the center side is greater than the sloping angle of the portion on the side surface side.

Further, as shown in (d) of FIG. 7, in an end portion of the ZR-button 7b on the side surface side in the left-right direction of the game controller 1 (further in the positive x-axis direction), a sloping portion 75*b*, which slopes downward, is provided. Specifically, the sloping portion 75*b* in the end portion of the ZR-button 7*b* on the side surface side of the game controller 1 slopes in two steps. A portion of the ZR-button 7*b* close to the end portion on the side surface side of the game controller 1 has a slightly great sloping angle. That is, the sloping portion 75*b* of the ZR-button 7*b* includes a portion on the side surface side and a portion on the center side. With respect to the horizontal direction (the x-axis direction in the xyz coordinate system), the sloping angle of the portion on the side surface side is greater than the sloping angle of the portion on the center side.

As described above, the end portion of the ZR-button 7*b* on the center side of the game controller 1 slopes, whereby it is easy for even a person having a long finger to operate the ZR-button 7*b*. That is, if the finger of the user is long, and when the user operates the ZR-button 7*b*, the tip of the finger reaches the end portion of the ZR-button 7*b* on the center side of the game controller 1. The sloping portion 74*b*, however, is provided in the end portion on the center side, whereby the sloping portion 74*b* fits the finger, and it is easy for the user to operate the ZR-button 7*b* (see FIG. 4).

Further, the end portion of the ZR-button 7*b* on the side surface side of the game controller 1 slopes, whereby it is easy for both a person having a long finger and a person having a short finger to operate the ZR-button 7*b*. That is, a user having a short finger can operate the ZR-button 7*b* by placing the tip of the finger on the end portion of the ZR-button 7*b* on the side surface side of the game controller 1. On the other hand, when a user having a long finger operates the ZR-button 7*b*, a portion near the base or the second joint of the index finger hits the end portion of the ZR-button 7*b* on the side surface side, and the tip of the finger hits the end portion of the ZR-button 7*b* on the center side. A sloping portion 75*d* is provided in the end portion on the side surface side, whereby, when the end portion of the ZR-button 7*b* on the center side is pressed by the extremity of the index finger, it is possible to make small a force (a force by reaction) applied to the portion near the base or the second joint of the finger, and make it easy for the user to press the ZR-button 7*b*.

Further, as shown in (c) of FIG. 2, the extremity of the ZR-button 7*b* on the back surface side of the game controller 1 (an end portion in the positive z-axis direction) is located closer to the front surface of the game controller 1 than the outer edge (a surface parallel with the back surface) of a center portion of a back surface of the housing 10 is. Specifically, as shown in (d) of FIG. 2, the extremity of the ZR-button 7*b* on the back surface side slightly protrudes further to the back surface side than the outer edge of the back surface of the housing 10 at the position of the ZR-button 7*b* thereof, but is located closer to the front surface than the outer edge of the center portion of the back surface of the housing 10 is. Thus, if the game controller 1 is placed on a planar surface, the game controller 1 is supported by the center portion of the back surface of the housing 10.

Figure 9:
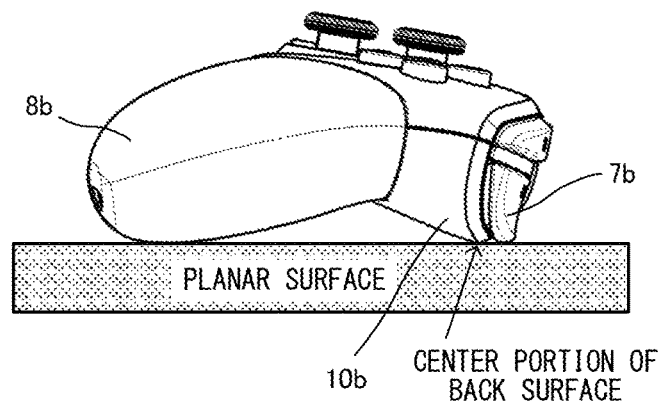
FIG. 9 is a diagram showing, when the game controller 1 is placed on a planar surface, a non-limiting example of the game controller 1 as viewed from a direction parallel with the planar surface.

FIG. 9 is a diagram showing, when the game controller 1 is placed on a planar surface, the game controller 1 as viewed from a direction parallel with the planar surface. As shown in FIG. 9, if the game controller 1 is placed on a planar surface, the grip portion 8*a*, the grip portion 8*b*, and the center portion of the back surface of the housing 10 come into contact with the planar surface, and the load of the game controller 1 is applied to these three portions. It should be noted that if the game controller 1 is placed on a planar surface, at least one of the ZL-button 7*a* and the ZR-button 7*b* may come into contact with the planar surface. The load, however, is mainly applied to the center portion of the back surface of the housing 10, the grip portion 8*a*, and the grip portion 8*b*. Thus, even if the game controller 1 is placed on a planar surface, the ZL-button 7*a* and the ZR-button 7*b* are not pressed. Further, even in a case where a large load is applied to the game controller, such as a where the user accidentally steps on the game controller 1 placed on a planar surface, a large load is applied to the center portion of the back surface of the housing 10, the grip portion 8*a*, and the grip portion 8*b*, and a large load is not applied to the ZL/ZR button 7. Thus, it is possible to prevent a large load from being applied to the ZL/ZR button 7, which is structurally weaker in strength than the housing 10, and the button from being damaged.

Further, as shown in (b) of FIG. 7, the closer to the back surface side of the game controller 1, the further upward the ZR-button 7*b* is warped. Specifically, as shown in (c) of FIG. 6 and (b) of FIG. 7, the ZR-button 7*b* is curved downward from an end portion on the front surface side of the game controller 1 to a center portion of the ZR-button 7*b* and is curved upward near an end portion on the back surface side of the game controller 1. The degree of warp of the ZR-button 7*b* gradually becomes larger from the end portion on the front surface side to near the end portion of the back surface side. The ZR-button 7*b* slopes downward in an end portion on the back surface side (the sloping portion 75*d* goes around to the back surface side). More specifically, as shown in (b) of FIG. 7, a curvature r1 of the upper surface of the ZR-button 7*b* on the back surface side of the game controller 1 is greater than a curvature r2 of the upper surface of the ZR-button 7*b* on the front surface side of the game controller 1. That is, an end portion of the upper surface of the ZR-button 7*b* on the front surface side (a point A), the center portion of the ZR-button 7*b* (a point B at the midpoint between the point A and a point C in (b) of FIG. 7), and a portion on the near side (the point C) in an end portion of the ZR-button 7*b* sloping downward on the back surface side are different in curvature. The closer to the point A, the point B, and the point C, the greater the curvature gradually becomes. Further, a change in the curvature from the point B to the point C is greater than a change in the curvature from the point A to the point B.

As described above, in the game controller 1 according to the exemplary embodiment, the further in the direction of the back surface, the further upward the ZR-button 7*b* is warped. The degree of warp of the ZR-button 7*b* gradually becomes larger. The ZR-button 7*b* slopes downward in the end portion of the back surface side. Thus, it is easy for the user to operate the ZR-button 7*b*. For example, if the degree of warp of the ZR-button 7*b* abruptly changes, the ZR-button 7*b* is a hindrance and makes it difficult for a user having a long finger to operate the button. For example, if the user places their index finger on the back surface of the game controller 1 without placing the finger on the ZR-button 7*b* when the user does not operate the ZR-button 7*b*, the user needs to move the finger from the back surface onto the ZR-button 7*b* when operating the ZR-button 7*b*. If, however, the degree of warp of the ZR-button 7*b* abruptly changes, the finger hits the apex of this warped portion. In the game controller 1 according to the exemplary embodiment, however, the degree of warp of the ZR-button 7*b* gradually becomes larger. Thus, the finger of the user is less likely to hit the apex of the warped portion, and it is easy for the user to operate the ZR-button 7*b*. Further, the end portion of the ZR-button 7*b* on the back surface side of the game controller 1 slopes downward. Thus, the finger of the user is less likely to hit the warped portion.

Specifically, in the ZR-button 7b, the sloping portion 71b is provided on the back surface side, and an upper end portion of the second housing 10b does not protrude in the direction of the back surface. Thus, if the user places their finger on the housing 10 on the back surface side, it is easy to access the ZR-button 7b and the R-button 6b. As shown in FIGS. 2 and 7, the extremity of the ZR-button 7b on the back surface side protrudes slightly further to the back surface side than the outer edge of the second housing 10b at the position of the ZR-button 7b. However, the sloping portion 71b is provided, and further, the upper end portion of the second housing 10b does not protrude in the direction of the back surface. Thus, when the user moves their finger from the back surface side of the housing 10 to the positions of the ZR-button 7b and the R-button 6b, the finger is less likely to hit the extremity of the ZR-button 7b on the back surface side and the upper end portion of the housing 10 on the back surface side. Thus, it is possible to smoothly move the finger from the back surface side to the positions of the ZR-button 7b and the R-button 6b.

Further, as shown in (b) and (c) of FIG. 7, the lower portion 73b of the ZR-button 7b includes a bearing portion 76b and is supported to be pivotable by a shaft extending in the left-right direction of the game controller 1 (the x-axis direction). The bearing portion 76b is provided further in the direction of the front surface of the game controller 1 (the negative z-axis direction). The ZR-button 7b is configured to pivot about the shaft, thereby being pressed in the down direction of the game controller 1 (the negative y-axis direction).

Figure 10:
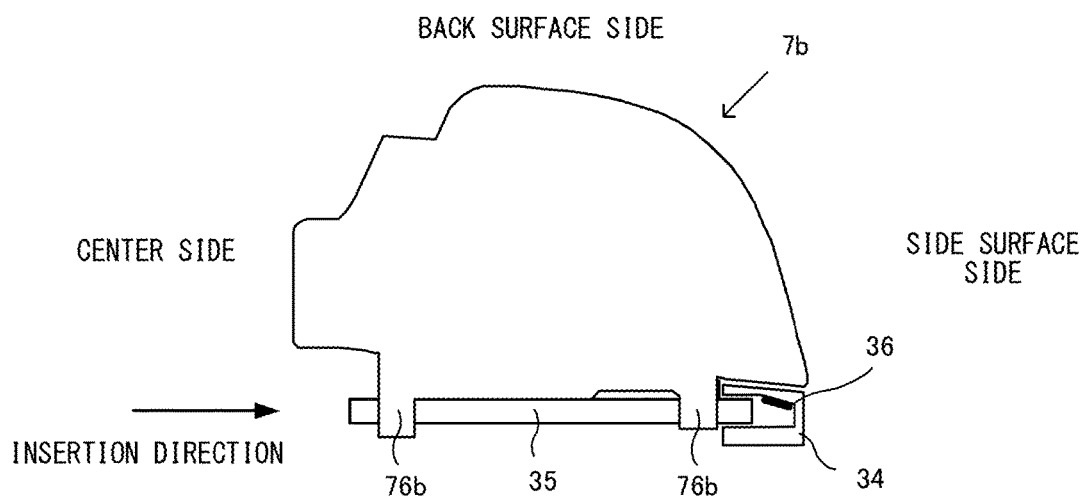
FIG. 10 is a diagram showing a non-limiting example of a structure for fixing the ZR-button 7b to the button frame 30.

FIG. 10 is a diagram showing an example of a structure for fixing the ZR-button 7b to the button frame 30. FIG. 10 is a diagram showing the ZR-button 7b as viewed from its upper surface. As shown in FIG. 10, the ZR-button 7b is supported to be pivotable by a shaft 35. In an end portion of the button frame 30 on the right side, a bearing portion 34, which receives the shaft 35, is provided. The shaft 35 is inserted from the center side of the game controller 1 in the direction of the side surface of the game controller 1, and is not inserted from the side surface side of the game controller 1. The shaft 35 is configured to be inserted only from the center side of the game controller 1, and therefore, it is possible to extend the ZR-button 7b to near an end portion of the side surface of the game controller 1. Further, the entrance of the bearing portion 34 is slightly larger than the diameter of the shaft 35. The further in the depth direction of the bearing portion 34, the narrower the bearing portion 34. For example, a buffer material 36 is applied inside the bearing portion 34 in the depth direction. Consequently, when the shaft 35 is inserted, it is possible to firmly fix the shaft 35 to the button frame 30. It should be noted that the position of the buffer material 36 is not limited to that exemplified in FIG. 10. Alternatively, the buffer material may be provided at any position where the ZR-button 7b comes into contact with a part of the button frame 30.

(Relationship Between L/R Button and ZL/ZR Button)

Next, the relationship between the L/R button and the ZL/ZR button is described. As shown in (d) of FIG. 6, the length in the left-right direction (the x-direction) of the L-button 6a is longer than the length in the left-right direction of the ZL-button 7a. Further, the length in the vertical direction (the z-direction: the direction of the front surface of the game controller 1) of the ZL-button 7a is longer than the length in the vertical direction of the L-button 6a. That is, the ZL-button 7a is formed to so as be longer than the L-button 6a in the direction of the back surface of the game controller 1.

Further, the further in the direction of the side surface of the game controller 1, the further downward the L/R button 6 slopes. Thus, it is easy for the user to operate the ZL/ZR button 7, which is located on the back surface side. Thus, it is possible to prevent the user from erroneously pressing the L/R button 6 when pressing the ZL/ZR button 7. That is, as shown in FIG. 4, if the user presses the ZL/ZR button 7 on the back surface side with their index finger, for example, a portion from the first joint to the second joint of the index finger may touch the L/R button 6. At this time, if the further in the direction of the side surface from the center of the game controller 1, the further downward the L/R button 6 does not slope, the finger is likely to come into contact with the L/R button 6. The L/R button 6, however, slopes downward, and therefore, the finger is less likely to hit an end portion of the L/R button 6 on the side surface side. Thus, it is possible to prevent the user from erroneously pressing the L/R button 6 when pressing the ZL/ZR button 7.

Further, in the end portion of the L/R button 6 on the side surface side, the sloping portion 62 (a, b), which slopes in two steps, is provided. Thus, when the user operates the ZL/ZR button 7, the finger is less likely to hit the end portion of the L/R button 6 on the side surface side. Thus, it is possible to prevent the user from erroneously pressing the L/R button 6. For example, a user having a long finger operates the ZL/ZR button 7 by placing the finger in an end portion of the ZL/ZR button 7 on the center side. At this time, a base portion of the finger may hit the end portion of the L/R button 6 on the side surface side. In the exemplary embodiment, the end portion of the L/R button 6 on the side surface side slopes downward, and therefore, the base portion of the finger is less likely to hit the end portion of the L/R button 6 on the side surface side. Thus, it is possible to prevent the user from erroneously pressing the L/R button 6 when operating the ZL/ZR button 7.

Further, the closer to the side surface of the game controller 1, the smaller the width (the width in the z-direction) of the L/R button 6. This makes it possible to prevent the user from erroneously pressing the L/R button 6 when pressing the ZL/ZR button 7. For example, if the width of the L/R button 6 is great in an end portion of the side surface of the L/R button 6, and when the user operates the ZL/ZR button 7 by moving their finger from the position of the L/R button 6 to the position of the ZL/ZR button 7, the finger may touch the end portion of the side surface of the L/R button 6, and the user may erroneously press the L/R button 6. However, the closer to the side surface, the smaller the width of the L/R button 6. Thus, it is possible to prevent the user from erroneously pressing the L/R button 6.

Further, the L/R button 6 includes the sloping portion 63 (a, b) in an end portion of the L/R button 6 on the front surface side. Thus, when the user places their finger on the front surface side of the housing 10, it is easy to access the L/R button 6, and it is also easy to access the ZL/ZR button 7. That is, the end portion of the L/R button 6 on the front surface side slopes, and therefore, when the user moves their finger from the front surface side of the housing 10 to the ZL/ZR button 7, it is possible to prevent the finger from touching the L/R button 6. Further, as described above, the end portion of the L/R button 6 on the front surface side slopes. Thus, also in the case of a user who holds the game controller 1 by covering the front surface of the game controller 1 with their hand, without holding the grip portion 8 of the game controller 1, it is easy for the user to operate the ZL/ZR button 7. Thus, it is possible to prevent the user from erroneously pressing the L/R button 6 when operating the ZL/ZR button 7.

Further, as shown in (d) of FIG. 6, the ZR-button 7b is located closer to the side surface of the game controller 1 than the R-button 6b is. Specifically, the left end (an end portion on the center side in the left-right direction of the game controller 1) of the ZR-button 7b is located closer to the side surface of the game controller 1 (further in the positive x-axis direction) than the left end (an end portion on the center side in the left-right direction of the game controller 1) of the R-button 6b. On the other hand, the right end (an end portion on the side surface side in the left-right direction of the game controller 1) of the ZR-button 7b is approximately coincide with the right end (an end portion on the side surface side in the left-right direction of the game controller 1) of the R-button 6b. Thus, the center position of the ZR-button 7b is located closer to the side surface of the game controller 1 than the center position of the R-button 6b is. The button detection sections provided below the ZR-button 7b and the R-button 6b also have a similar positional relationship.

Figure 11:
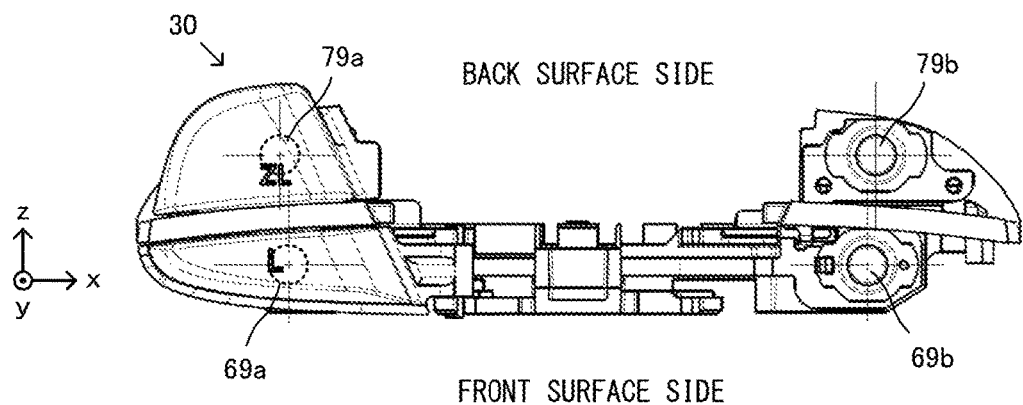
FIG. 11 is a top view of a non-limiting example of the button frame 30 when the key tops of the R-button 6b and the ZR-button 7b are removed.

FIG. 11 is a top view of the button frame 30 when the key tops of the R-button 6b and the ZR-button 7b are removed.

As shown in FIG. 11, below the key top of the R-button 6b, an R-button detection section 69b for detecting an operation on the R-button 6b is placed. Similarly, below the key top of the L-button 6a, an L-button detection section 69a for detecting an operation on the L-button 6a is placed. Further, below the key top of the ZR-button 7b, a ZR-button detection section 79b for detecting an operation on the ZR-button 7b is placed. Similarly, below the key top of the ZL-button 7a, a ZL-button detection section 79a for detecting an operation on the ZL-button 7a is placed.

Specifically, the R-button detection section 69b is placed in the approximate centers in the left-right direction (the x-axis direction) and the front-back direction (the z-axis direction) of the key top of the R-button 6b. Further, the ZR-button detection section 79b is placed in the approximate center in the front-back direction (the z-axis direction) of the key top of the ZR-button 7b and placed slightly closer to the center of the game controller 1 than the center in the left-right direction of the key top of the ZR-button 7b.

If the R-button detection section 69b and the ZR-button detection section 79b are compared with each other, the ZR-button detection section 79b is located closer to the side surface of the game controller 1 than the R-button detection section 69b is. Similarly, if the L-button detection section 69a and the ZL-button detection section 79a are compared with each other, the ZL-button detection section 79a is located closer to the side surface of the game controller 1 than the L-button detection section 69a is. That is, the ZL-button detection section 79a and the ZR-button detection section 79b are located on the outer side of the game controller 1, and the L-button detection section 69a and the R-button detection section 69b are located on the inner side of the game controller 1.

The reason why the ZL-button 7a and the ZR-button 7b (the ZL-button detection section 79a and the ZR-button detection section 79b) on the back surface side are located further outside is to match the track of the finger when the user operates the ZR-button 7b and the R-button 6a with their index finger, for example.

Figure 12:
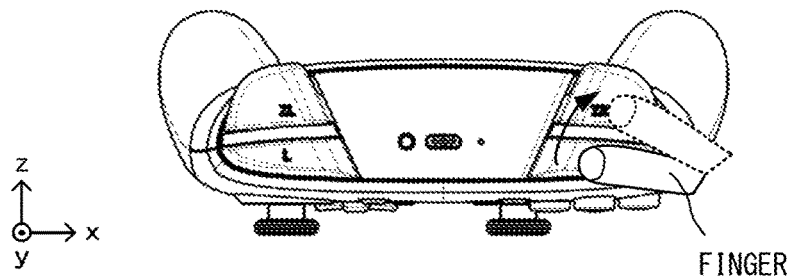
FIG. 12 is a diagram showing a non-limiting example of the motion of the index finger when the user operates the ZR-button 7b and the R-button 6b.

FIG. 12 is a diagram showing the motion of the index finger when the user operates the ZR-button 7b and the R-button 6a. As shown in FIG. 12, if the index finger moves from the position of the R-button 6b to the position of the ZR-button 7b, the finger of the user moves so as to draw a circular arc about the base of the finger. For example, if the user holds the grip portion 8b with their right hand, the base of the index finger is typically located on the extension of the R-button 6b on the right side surface of the game controller 1 (see FIG. 4). If the user operates the ZR-button 7b when placing their index finger on the R-button 6b, the user moves the finger in the direction of the back surface while almost keeping fixing the base of the index finger. Thus, the index finger of the user moves so as to draw a circular arc about its base. The further in the direction of the back surface of the game controller 1 the finger moves, the further in the direction of the side surface of the game controller 1 the extremity of the finger moves. Thus, the extremity of the index finger is located further in the direction of the side surface of (on the outer side of) the game controller 1 after the finger moves to the position of the ZR-button 7b than when the finger is located at the position of the R-button 6a.

In the game controller 1 according to the exemplary embodiment, the ZR-button 7b is placed on the outer side of the R-button 6b, taking into account such a motion of the finger of the user. Similarly, the ZR-button detection section 79b is also placed on the outer side of the R-button detection section 69b. With such placement of the buttons, it is possible to make it easy for the user to operate the ZR-button 7b and the R-button 6a. Further, the detection section for each button is similarly placed, whereby it is possible to place the detection section for the button approximately immediately below the finger when the user presses the button, and to certainly detect the operation of the user.

Referring back to FIG. 6, between the R-button 6b and the ZR-button 7b, a division wall 31b (a predetermined surface), which divides these buttons, is provided. The division wall 31b is a part of the button frame 30. Here, the height of the division wall 31b and the heights of the R-button 6b and the ZR-button 7b are described. It should be noted that each of the "heights" of the R-button 6b, the ZR-button 7b, and the division wall 31b as used herein indicates the distance from a surface parallel with the z-axis (an axis parallel with the direction of pressing the A-button 2a or the like provided on the front surface of the game controller 1) and the x-axis (an axis parallel with the left-right direction of the game controller 1 when viewed from the front) with respect to the game controller 1. That is, each of the "heights" of the R-button 6b, the ZR-button 7b, and the division wall 31b is a height with respect to the z-axis and the x-axis and indicates a distance in the y-axis direction.

Figure 13:
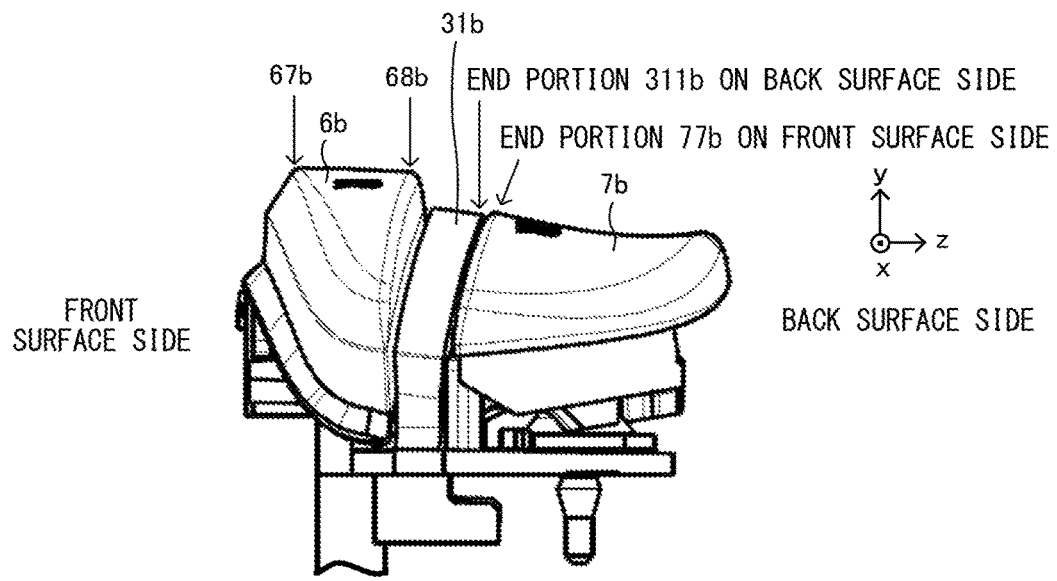
FIG. 13 is a partially enlarged view of a non-limiting example of (c) of FIG. 6.

FIG. 13 is a partially enlarged view of (c) of FIG. 6. As shown in FIG. 13, the height of the division wall 31b is smaller than that of the R-button 6b. Even when the R-button 6b is pressed, the height of the division wall 31b is smaller than the height of the R-button 6b. That is, both when the R-button 6b is not pressed and when the R-button 6b is pressed, a straight line extending from any point on an upper surface of the R-button 6b in the z-axis direction does not hit the division wall 31b. Further, if the ZR-button 7b is not pressed, the height of an end portion 311b of the division wall 31b on the back surface side of the game controller 1 is slightly smaller than the height of an end portion 77b of the ZR-button 7b on the front surface side of the game controller 1. That is, in a case where the ZR-button 7b is not pressed, a straight line extending from the end portion 77b of the ZR-button 7b in the negative z-axis direction does not hit the end portion 311b of the division wall 31b on the back surface side. Even when the ZR-button 7b is pressed, the height of the end portion 311 of the division wall 31b on the back surface side is slightly smaller than, or approximately the same as, the height of the end portion 77b of the ZR-button 7b on the front surface side of the game controller 1. That is, in a case where the ZR-button 7b is pressed, a straight line extending from the end portion 77b of the ZR-button 7b in the negative z-axis direction does not hit the end portion 311b of the division wall 31b on the back surface side, or passes through the end portion 311b of the division wall 31b.

The division wall 31b is provided between the R-button 6b and the ZR-button 7b, whereby the user can use the division wall 31b as a place to put their finger when the user does not operate the R-button 6b or the ZR-button 7b. Thus, it is possible to prevent the user from erroneously operating the R-button 6b or the ZR-button 7b. Further, both when the ZR-button 7b is not pressed and when the ZR-button 7b is pressed, the height of the end portion 77b of the ZR-button 7b on the front surface side of the game controller 1 is greater than (or substantially the same as) the height of the end portion 311b of the division wall 31b on the back surface side. Thus, it is possible to make the finger less likely to be caught between the ZR-button 7b and the division wall 31b. The ZR-button 7b pivots using as a pivot point the shaft 35 (see FIG. 10), which is located on the division wall 31b side in FIG. 13. Thus, if the ZR-button 7b is pressed, a gap occurs between the ZR-button 7b and the division wall 31b. However, even when the ZR-button 7b is pressed, and if the height of the division wall 31b is smaller than (or substantially the same as) the height of the ZR-button 7b in a boundary portion between the ZR-button 7b and the division wall 31b, the finger is less likely to enter the gap between the ZR-button 7b and the division wall 31b, and the finger is less likely to be caught.

Further, if the heights of the R-button 6b on the front surface side and the ZR-button 7b on the back surface side are compared with each other, the height of an end portion 68b of the R-button 6b on the back surface side of the game controller 1 is greater than the height of the end portion 77b of the ZR-button 7b on the front surface side of the game controller 1. Specifically, as shown in FIG. 13, the height of the R-button 6b is greater than that of the ZR-button 7b overall from the end portion 67b on the front surface side of the game controller 1 to the end portion 68b on the back surface side of the game controller 1. That is, a straight line extending from any point on the upper surface of the R-button 6b in the z-axis direction does not hit the ZR-button 7b. Thus, the user only touches the R-button 6b and the ZR-button 7b with their finger and thereby can recognize whether the button is the R-button 6b or the ZR-button 7b.

It should be noted that the closer to the side surface, the further downward the R-button 6b slopes. Thus, in the end portion on the side surface side (the end portion in the near-side direction of the paper in FIG. 13), the height of the R-button 6b is approximately the same as that of the ZR-button 7b. That is, as shown in (f) of FIG. 2, if the game controller 1 is viewed from the back surface side, the heights of the end portions of the L/R button 6 and the ZL/ZR button 7 on the side surface side are approximately the same. Thus, in a case where the user moves their finger in the front-back direction of the game controller 1, the finger is less likely to hit the end portions of the L/R button 6 and the ZL/ZR button 7 on the side surface side. Thus, it is possible to prevent the user from erroneously pressing the ZL/ZR button 7 when pressing the L/R button 6, and conversely, it is possible to prevent the user from erroneously pressing the L/R button 6 when pressing the ZL/ZR button 7.

As described above, in the exemplary embodiment, the ZL/ZR button 7 is provided to the side of the L/R button 6 closer to the back surface side of the game controller 1. The ZL/ZR button 7 includes the protruding portion 71, which protrudes in the direction of the back surface and the direction of the side surface, whereby it is easy for the user to operate the ZL/ZR button 7, which is located on the back surface side. Further, the L/R button 6 and the ZL/ZR button 7 include the above features (the sloping portion in the end portion in the left-right direction (the x-axis direction), the sloping portion in the end portion in the front-back direction (the z-axis direction), the position in the left-right direction, the height in the y-axis direction, and the like). Thus, it is difficult for the user to confuse the L/R button 6 and the ZL/ZR button 7 with each other, and it is easy for the user to operate the L/R button 6 and the ZL/ZR button 7.

Further, in the exemplary embodiment, the L/R button 6, the ZL/ZR button 7, the shafts supporting these buttons, and the detection sections for detecting the pressing of these buttons are formed integrally as the button frame 30. Thus, it is possible to make an error in the manufacture of each button smaller than a case where each button is fixed to the housing 10, and to prevent rattling when each button is operated.

[Description of Grip Portion]

Figure 14:
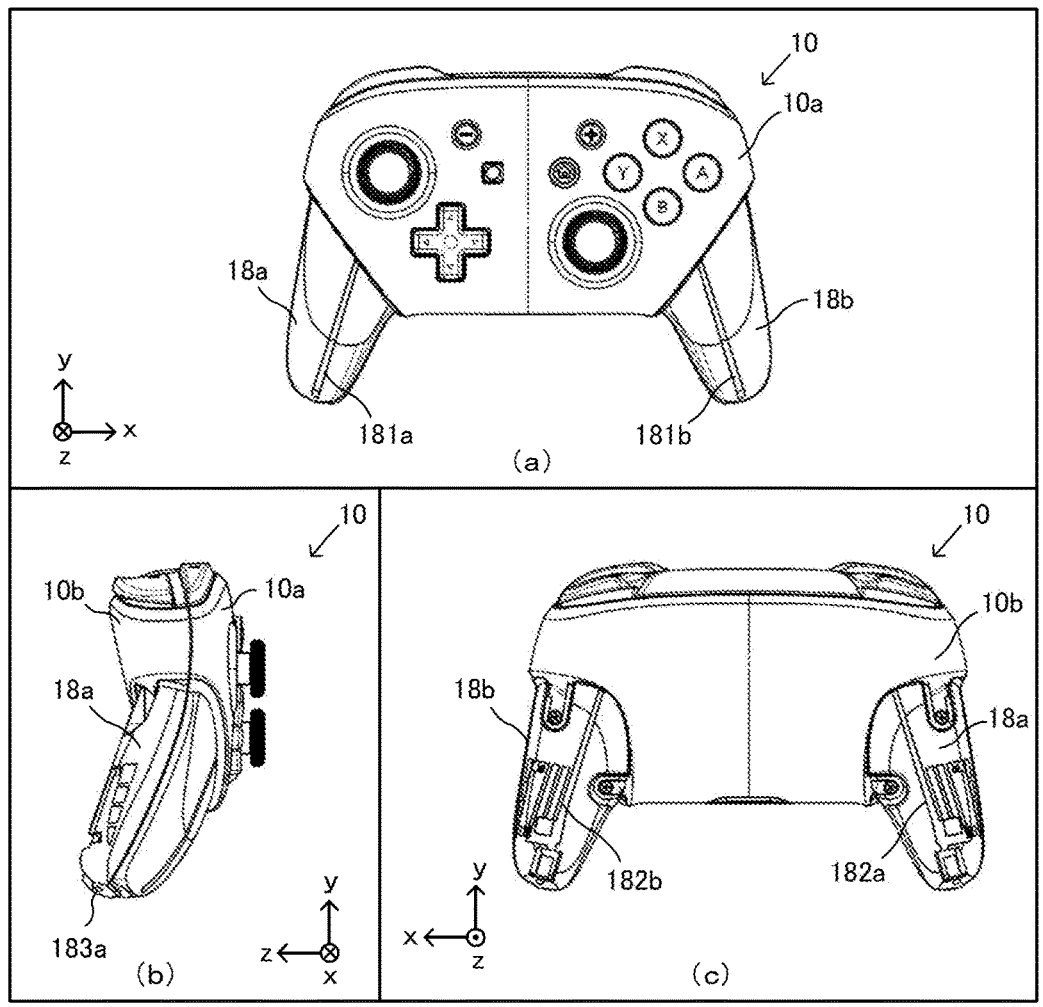
FIG. 14 is an external view of a non-limiting example of the state where a grip portion 8 of the game controller 1 is removed.
Figure 15:
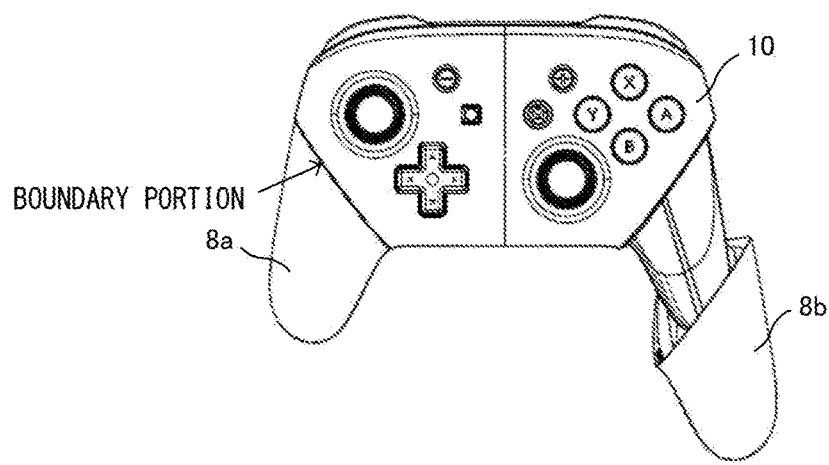
FIG. 15 is a diagram showing a non-limiting example of the state of the middle of removing a grip portion 8b of the game controller 1 on the right side.

Next, the grip portion 8 of the game controller 1 is described. FIG. 14 is an external view of the state where the grip portion 8 of the game controller 1 is removed. (a) of FIG. 14 is a front view when the grip portion 8 of the game controller 1 is removed. (b) of FIG. 14 is a left side view when the grip portion 8 of the game controller 1 is removed. (c) of FIG. 14 is a rear view when the grip portion 8 of the game controller 1 is removed. FIG. 15 is a diagram showing the state of the middle of removing the grip portion 8b of the game controller 1 on the right side. It should be noted that an x-axis, a y-axis, and a z-axis in FIG. 14 correspond to the x-axis, the y-axis, and the z-axis, respectively, in FIG. 2.

As shown in FIGS. 14 and 15, each of the grip portions 8a and 8b of the game controller 1 is configured to be able to be separated from the housing 10 (a main body housing). As described above, the housing 10 is formed by connecting the first housing 10a on the front surface side of the game controller 1 and the second housing 10b on the back surface side of the game controller 1 (FIG. 5).

As shown in FIG. 14, the housing 10, which is formed by connecting the first housing 10a and the second housing 10b, includes a controller main body portion in which various operation buttons, analog sticks, and the like for a game operation are provided, a first holding portion (first protruding portion) 18a, and a second holding portion (second protruding portion) 18b. The first holding portion 18a protrudes downward (in the negative y-axis direction) from the left of the center of the controller main body portion. As shown in (b) of FIG. 14, the first holding portion 18a is curved in the direction of the back surface (the positive z-axis direction). The second holding portion 18b protrudes downward (in the negative y-axis direction) from the right of the center of the controller main body portion. The second holding portion 18b is curved in the direction of the back surface (the positive z-axis direction). It should be noted that the first holding portion (first protruding portion) 18a is a portion to be held (through the grip portion 8a) by the left hand of the user when the grip portion 8a is connected to the first holding portion 18a. Here, the first holding portion (first protruding portion) 18a is not a portion to be directly held by the user, but is a portion to be indirectly held by the user. Thus, the first holding portion 18a is referred to as a "first holding portion". The same applies to the second holding portion (second protruding portion) 18b.

In the first holding portion 18a, a guide 181a is provided on the front surface side. The guide 181a is a long and narrow recessed groove and is used to guide the grip portion 8a to a predetermined position in the process of fitting the grip portion 8a to the first holding portion 18a. The guide 181a extends from an extremity portion (a lower portion in FIG. 14) to the base (an upper portion) of the first holding portion 18a. The guide 181a is formed such that the width of the guide 181a on the extremity side is greater than that of the guide 181a on the base side.

Further, as shown in (c) of FIG. 14, in the first holding portion 18a, a guide 182a is provided on the back surface side. The guide 182a is a long and narrow recessed groove and is used to guide the grip portion 8a to a predetermined position in the process of fitting the grip portion 8a to the first holding portion 18a. The guide 182a extends from an extremity portion (a lower portion) to the base (an upper portion) of the first holding portion 18a. The guide 182a is formed such that the width of the guide 182a on the extremity side is greater than that of the guide 182a on the base side.

Further, as shown in (b) of FIG. 14, at the extremity of the first holding portion 18a, a screw hole 183a, through which to insert a screw, is provided. The grip portion 8a is fitted to the first holding portion 18a, and the grip portion 8a and the first holding portion 18a are screwed together, thereby fixing the grip portion 8a to the first holding portion 18a. It should be noted that a screw hole does not necessarily need to be provided at the extremity of the first holding portion 18a. Alternatively, a screw hole may be provided in an extremity portion including the extremity (including the extremity and a portion near the extremity).

The same applies to the second holding portion 18b. That is, also in the second holding portion 18b, guides 181b and 182b are provided on the front surface side and the back surface side. Further, in an extremity portion of the second holding portion 18b, a screw hole 183b, through which to insert a screw, is provided.

Figure 16:
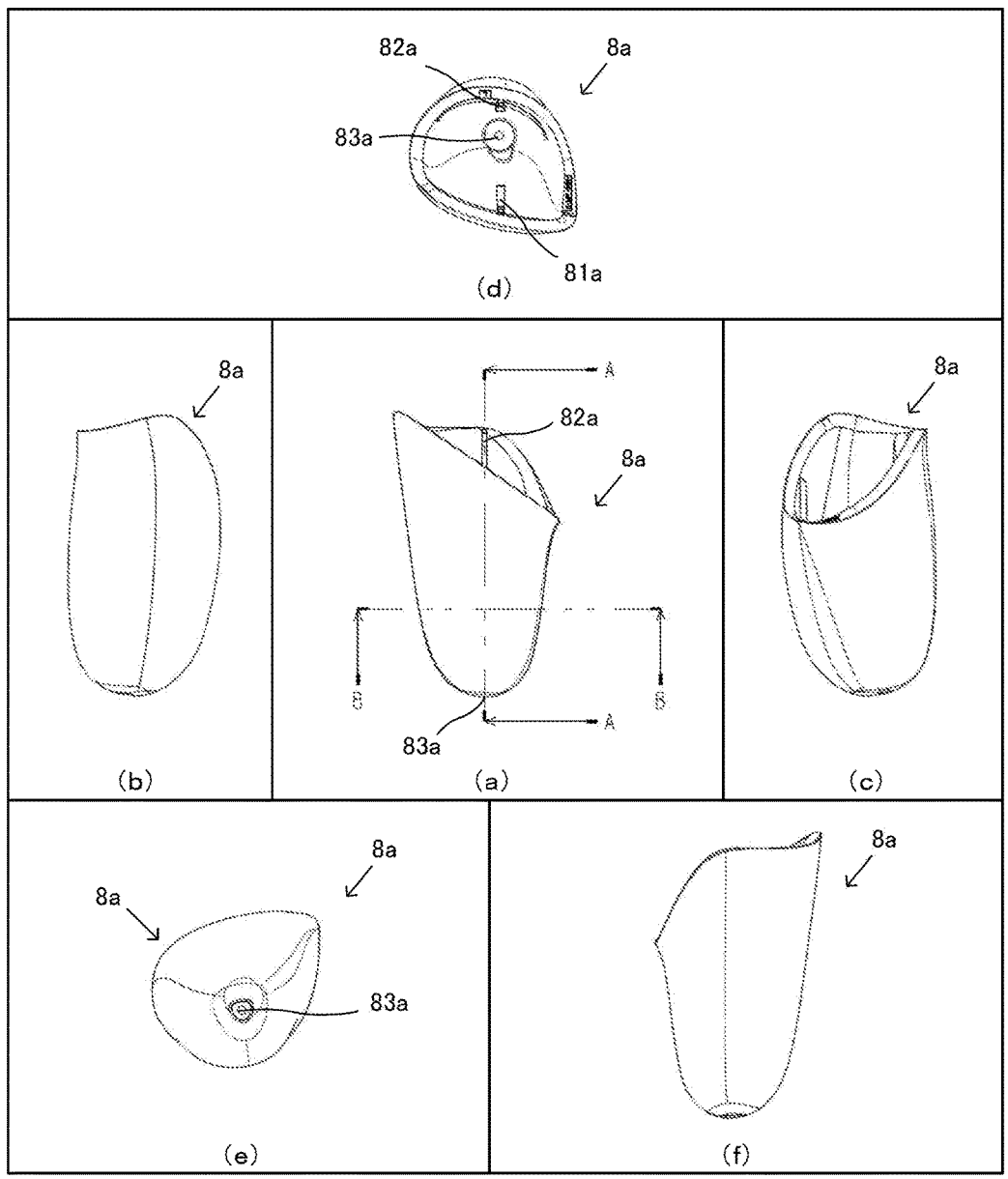
FIG. 16 is an external view of a non-limiting example of a grip portion 8a, which is fitted to a first holding portion 18a of a housing 10.
Figure 17A:
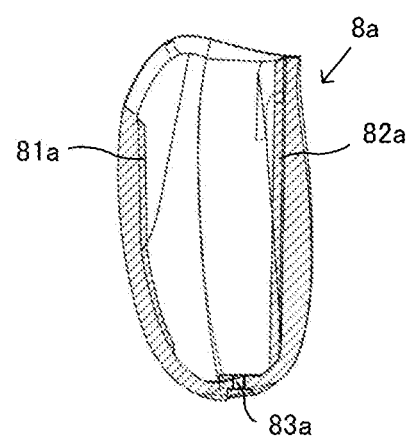
FIG. 17A is a non-limiting example of a cross-sectional view along a line A-A in FIG. 16.
Figure 17B:
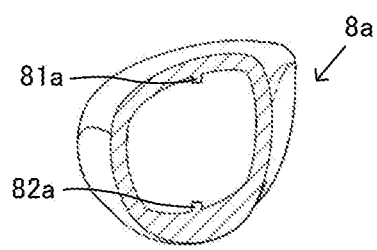
FIG. 17B is a non-limiting example of a cross-sectional view along a line B-B in FIG. 16.

Next, the grip portion 8 is described in detail. FIG. 16 is an external view of the grip portion 8a, which is fitted to the first holding portion 18a of the housing 10. (a) of FIG. 16 is a front view of the grip portion 8a and is a diagram of the grip portion 8a as viewed from the same direction as that in (a) of FIG. 2. Further, (b) of FIG. 16 is a left side view of the grip portion 8a. (c) of FIG. 16 is a right side view of the grip portion 8a. (d) of FIG. 16 is a top view of the grip portion 8a. (e) of FIG. 16 is a bottom view of the grip portion 8a. (f) of FIG. 16 is a rear view of the grip portion 8a. FIG. 17A is a cross-sectional view along a line A-A in FIG. 16. FIG. 17B is a cross-sectional view along a line B-B in FIG. 16.

It should be noted that in FIGS. 16, 17A, and 17B, a structure for fixing a vibration motor 50 described later is omitted. The structure for fixing the vibration motor 50 will be described in detail later.

Further, the grip portion 8a on the left side and the grip portion 8b on the right side are symmetrical. Although only the grip portion 8a on the left side is described below, the same applies to the grip portion 8b on the right side. Further, hereinafter, the grip portions 8a and 8b will occasionally be collectively referred to as a "grip portion 8", and the first holding portion 18a and the second holding portion 18b will occasionally be collectively referred to as a "holding portion 18".

As shown in FIG. 16, the grip portion 8a is a hollow member and is so shaped as to protrude in a predetermined direction (downward). The grip portion 8a is so shaped that if the grip portion 8a is cut along a plane perpendicular to the predetermined direction, the outer periphery of the cross section is approximately elliptical. Specifically, the shape of the outer periphery of the cross section is a shape obtained by deforming an ellipse and is an approximately oval shape having a blunt end and a pointed end (FIG. 17B). It should be noted that the shape of the cross section is not limited to an approximate ellipse, and may be any shape such as a polygon (e.g., a triangle, a quadrilateral, a pentagon, or the like) having round corners.

The upper end of the grip portion 8a is open, and the lower end (except for the screw hole) of the grip portion 8a is closed. Further, the grip portion 8a is so formed that a left side surface of the grip portion 8a is longer in the up-down direction than a right side surface of the grip portion 8a. The area of the left side surface of the grip portion 8a is larger than the area of the right side surface of the grip portion 8a. If the user grips the grip portion 8a with their left hand, a center portion of the palm hits the left side surface side of the grip portion 8a, a base portion of the thumb hits the front surface side of the grip portion 8a, and the middle finger, the third finger, and the little finger hit the back surface side to the right side surface side of the grip portion 8a so as to go around these sides. That is, the left side surface of the grip portion 8a, of which the area is larger, hits the center portion of the palm of the user, and the right side surface of the grip portion 8a, of which the area is smaller, hits the middle finger, the third finger, the little finger, and the like.

The grip portion 8a is not formed by connecting two housing members (10a and 10b) with a screw or the like as in the housing 10, and is molded in an integrated manner. The surface of the grip portion 8a is smooth without a difference in level in a boundary portion formed by connecting two members as in the housing 10. It should be noted that depending on the method for molding the grip portion 8a, it may be possible to visually recognize the boundary between a plurality of members. The grip portion 8a, however, does not have a difference in level formed in a boundary portion between a plurality of separated members assembled and connected together by screwing, and the surface of the grip portion 8a is almost smooth.

As shown in FIGS. 16, 17A, and 17B, inside the grip portion 8a, the guide 81a is provided on the front surface side of the game controller 1, and the guide 82a is provided on the back surface side of the game controller 1. The guide 81a and the guide 82a are provided at positions opposed to each other. That is, the guide 81a and the guide 82a are provided on a straight line dividing the grip portion 8a into two approximately equal parts.

The guide 81a and the guide 82a are long and narrow protruding portions. Specifically, the guide 82a is formed so as to extend from an opening portion (the base) of the grip portion 8a to the lower end (an extremity portion) of the grip portion 8a. Further, the guide 81a is formed so as to extend from the opening portion (the base) of the grip portion 8a to near the lower end (the extremity portion) of the grip portion 8a. The guide 81a and the guide 82a are small in width in the opening portions (the bases). The closer to the extremity, the larger the width of the guide.

The protruding guide 81a of the grip portion 8a and the recessed guide 181a of the first holding portion 18a are engaged together, the protruding guide 82a of the grip portion 8a and the recessed guide 182a of the first holding portion 18a are engaged together, and the grip portion 8a is slid (upward as in FIG. 15), whereby it is possible to fit the grip portion 8a to the first holding portion 18a of the housing 10.

As described above, the grip portion 8a is so formed that the closer to the extremity, the larger the widths of the guides 81a and 82a of the grip portion 8a. The first holding portion 18a is so formed that the closer to the extremity, the larger the widths of the guides 181a and 182a of the first holding portion 18a. Thus, when the grip portion 8a is fitted to the first holding portion 18a, first, portions (protrusions) having smaller widths in the guides 81a and 82a of the grip portion 8a are engaged with portions (recessed grooves) having larger widths in the guides 181a and 182a of the first holding portion 18a. Thus, it is easy to fit the grip portion 8a to the first holding portion 18a. Further, the guides 81a and 82a extend to near the extremity of the grip portion 8a. Thus, it is easy to remove or attach the grip portion 8a.

Further, at the extremity of the grip portion 8a, a screw hole 83a is provided. The screw is inserted into the screw hole 83a and screwed, thereby connecting the first holding portion 18a and the grip portion 8a. The grip portion 8a is screwed to the first holding portion 18a at the extremity of the grip portion 8a. Thus, the user is less likely to touch the screw hole during a game operation. That is, if the user grips the grip portion 8a as in FIG. 4, the hand is less likely to touch the extremity portion of the grip portion 8. Thus, it is possible to eliminate discomfort when the user grips the grip portion 8.

As is clear from FIG. 15, the grip portion 8 covers the entirety of the outer periphery of the holding portion 18 of the housing 10. If the holding portion 18 is cut along a plane perpendicular to the longitudinal direction, the grip portion 8 covers the entirety of the outer periphery of the cross section of the holding portion 18. That is, the entirety of the holding portion 18 including a boundary portion between the first housing 10a and the second housing 10b is covered with the grip portion 8. Thus, if the user grips the grip portion 8, it is possible to prevent discomfort from occurring. That is, if the housing 10 is formed by connecting the first housing 10a and the second housing 10b, a difference in level may occur in the boundary portion between the two members, and the user may feel discomfort when gripping the holding portion 18. This may hinder a game operation. In the exemplary embodiment, the boundary portion between the first housing 10a and the second housing 10b is covered with the grip portion 8, whereby, when the user holds the game controller 1, the game controller 1 is likely to fit the hand well, and it is possible to improve the feel when the user grips the holding portion.

Further, if the housing 10 and the grip portion 8a are connected together, a boundary portion (see FIG. 15) between the housing 10 and the grip portion 8a is smoothly joined. Specifically, the height of the surface of the grip portion 8a in the boundary portion between the housing 10 and the grip portion 8a is substantially the same as the height of the surface of the controller main body portion of the housing 10 in the boundary portion. That is, there is no difference in level in the boundary portion between the grip portion and the controller main body portion. The heights of the surfaces of the controller main body portion and the grip portion 8 in the boundary portion between the controller main body portion and the grip portion 8 are the same. Thus, it is possible to improve the feel when the user holds the game controller 1.

It should be noted that the above configurations of the grip portion 8 and the holding portion 18 are merely illustrative, and may be the following configurations.

For example, in the above description, the protruding guides 81 and 82 are provided on the grip portion 8 side, and the recessed guides 181 and 182 are provided on the holding portion 18 side. Alternatively, a recessed guide may be provided on the grip portion 8 side, and a protruding guide may be provided on the holding portion 18 side. Yet alternatively, the guides 81a, 82a, 181a, and 182a may not necessarily need to be provided.

Further, in the above description, a screw is used to connect the grip portion 8 and the housing 10. However, a fixing structure for fixing the grip portion 8 to the housing 10 is not limited to this. Alternatively, for example, a latch portion (a hook) may be provided in either one of the grip portion 8 and the housing 10, a latched portion may be provided in the other, and the latch portion and the latched portion may be engaged together, thereby fixing the grip portion 8 to the housing 10. For example, the grip portion 8 may not be fixed to the holding portion 18 with a screw, and a latch portion (a hook) may be provided at the extremity of a guide used to fit the grip portion 8 to the holding portion 18. Thus, the grip portion 8 may be guided by the guide, and when the grip portion 8 is fitted all the way to the holding portion 18, the latch portion (the hook) may be caught by the latched portion of the holding portion 18. Yet alternatively, for example, a rubber member (or another cushioning buffer material, an elastic member, or the like) may be provided inside the grip portion 8 or outside the holding portion 18, and the grip portion 8 may be press-fitted to the holding portion 18, thereby fixing the grip portion 8 to the holding portion 18. Yet alternatively, for example, thread grooves may be provided in the grip portion 8 and the holding portion 18, and the grip portion 8 may be screwed to the holding portion 18, thereby fixing the grip portion 8 to the holding portion 18.

Further, the color and the material of the grip portion 8 may be the same as or different from those of the housing 10. For example, the grip portion 8 and the housing 10 may be formed of the same material and have the same color. Alternatively, the grip portion 8 and the housing 10 may be formed of the same material and have different colors. Yet alternatively, the grip portion 8 and the housing 10 may be formed of different materials and have the same color. For example, the grip portion 8 may be formed of a material softer than, or a material harder than, that of the housing 10.

Further, in the above description, the grip portion 8 covers the entirety of the holding portion 18. Alternatively, a part of the holding portion 18 may not be covered with the grip portion 8. For example, the grip portion 8 may cover at least a part of the boundary portion between the first housing 10a and the second housing 10b in the holding portion 18. Yet alternatively, the grip portion 8 may not cover the entire periphery of the holding portion 18, but may cover the boundary portion between the first housing 10a and the second housing 10b and cover at least a part of the outer periphery of the holding portion 18.

Further, in the above description, the left and right grip portions 8 are fitted to the housing 10 (the main body housing) of the game controller 1. Alternatively, for example, a grip portion as described above may be connected to a holding portion of a mobile game apparatus obtained by integrating a processing apparatus (a CPU or the like) for performing game processing and a display apparatus. In the mobile game apparatus, a main body housing including a holding portion may be formed by connecting a first housing and a second housing, and a grip portion for covering the holding portion may be provided. The grip portion is configured to at least cover a boundary portion between the first housing and the second housing in the holding portion.

Further, the above grip portion may be used not only in the two-handed game controller 1, but also in a one-handed controller. For example, in the one-handed controller, a main body housing including a holding portion may be formed by connecting a first housing and a second housing, and a grip portion for covering the holding portion may be provided. The grip portion is configured to at least cover a boundary portion between the first housing and the second housing in the holding portion of the one-handed controller.

[Description of NFC and Inner Substrates]

Next, the substrates within the game controller 1 are described. As shown in FIG. 5, within the housing 10, the first substrate 20 and the second substrate 40 are accommodated. The first substrate 20 is located on the front surface side of the game controller 1, and the second substrate 40 is located on the back surface side of the game controller 1. That is, the game controller 1 has a two-layer structure including the first substrate 20 and the second substrate 40.

Specifically, if the game controller 1 is viewed from the front (the front surface), the first substrate 20 and the second substrate 40 placed within the housing 10 overlap each other. That is, if the first substrate 20 and the second substrate 40 are projected (subjected to parallel projection) onto a plane parallel with the front surface of the game controller 1, the projected first substrate 20 overlaps at least a part of the projected second substrate 40. The first substrate 20 and the second substrate 40 are described below.

Figure 18A:
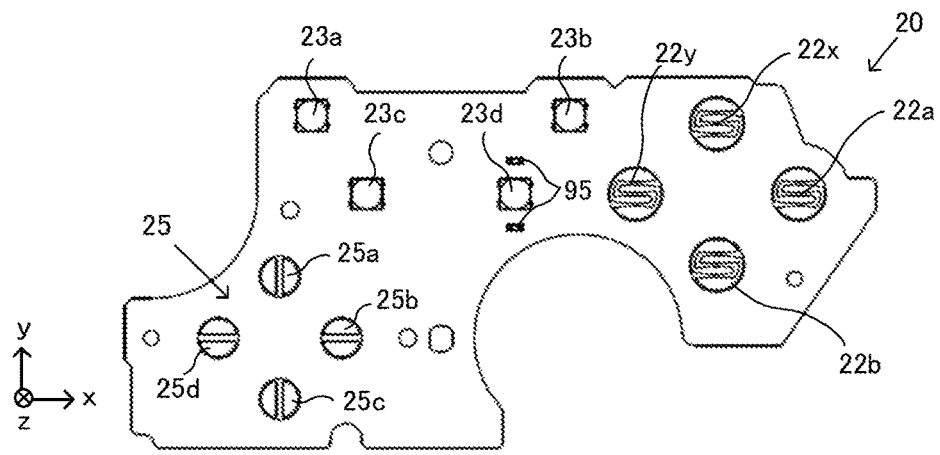
FIG. 18A is a front view of a non-limiting example of a first substrate 20.
Figure 18B:
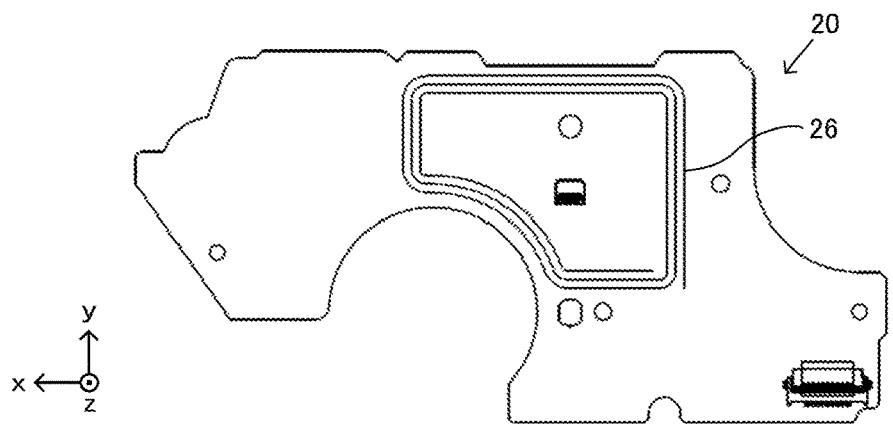
FIG. 18B is a rear view of a non-limiting example of the first substrate 20.

FIG. 18A is a front view of the first substrate 20. FIG. 18B is a rear view of the first substrate 20.

As shown in FIG. 18A, in a right region of the front surface of the first substrate 20, a switch (contact) 22a, which corresponds to the A-button 2a, a switch 22b, which corresponds to the B-button 2b, a switch 22x, which corresponds to the X-button 2x, and a switch 22y, which corresponds to the Y-button 2y, are placed. If the first substrate 20 is accommodated in the housing 10, the switch 22a, the switch 22b, the switch 22x, and the switch 22y are located immediately below the A-button 2a, the B-button 2b, the X-button 2x, and the Y-button 2y, respectively. For example, if the A-button 2a is pressed in the state where the first substrate 20 is accommodated in the housing 10, the switch 22a is also pressed, and the pressing of the A-button 2a is detected. The same applies to the B-button 2b, the X-button 2x, and the Y-button 2y.

Further, in a center region of the front surface of the first substrate 20, a switch 23a, which corresponds to the minus button 3a, a switch 23b, which corresponds to the plus button 3b, a switch 23c, which corresponds to the capture button 3c, and a switch 23d, which corresponds to the home button 3d, are provided. Further, above and below the switch 23d, which corresponds to the home button 3d, LEDs 95 are placed. The detailed structure of the home button 3d will be described later.

If the first substrate 20 is accommodated in the housing 10, the switch 23a, the switch 23b, the switch 23c, and the switch 23d are located immediately below the minus button 3a, the plus button 3b, the capture button 3c, and the home button 3d, respectively. For example, if the minus button 3a is pressed in the state where the first substrate 20 is accommodated in the housing 10, the switch 23a is also pressed, and the pressing of the minus button 3a is detected. The same applies to the plus button 3b, the capture button 3c, and the home button 3d.

Further, in a lower left region of the front surface of the first substrate 20, switches 25 (25a to 25d), which correspond to the directional pad 5, are placed. Specifically, the up direction of the directional pad 5 corresponds to the switch 25a, the right direction of the directional pad 5 corresponds to the switch 25b, the down direction of the directional pad 5 corresponds to the switch 25c, and the left direction of the directional pad 5 corresponds to the switch 25d. For example, if the up direction of the directional pad 5 is pressed, the switch 25a is also pressed, and the pressing of the up direction of the directional pad 5 is detected. The same applies to the other directions of the directional pad 5.

Meanwhile, as shown in FIG. 18B, in a center region of the back surface of the first substrate 20 (the surface on the back surface side of the game controller 1), an NFC antenna 26 is placed. The NFC antenna 26 is an antenna used for contactless communication. As the NFC antenna 26, a spiral antenna or a loop antenna is used.

Here, "contactless communication" in the present specification means a communication technique for performing communication at an extremely short distance (e.g., several centimeters to several tens of centimeters; typically, 10 centimeters or less). That is, "contactless communication" in the present specification does not mean a communication technique capable of performing communication even in a case where devices are several meters to several tens of meters away from each other, such as Bluetooth (registered trademark) or a wireless LAN, and means a communication technique for performing communication by holding an external storage device (an IC tag) over the apparatus. For example, contactless communication may be NFC (Near Field Communication) or RFID at the above extremely short distance. In the exemplary embodiment, it is assumed that contactless communication is NFC. It should be noted that not only the NFC standard but also another communication standard for performing contactless communication at the above extremely short distance may be used.

If the external storage device is present in a predetermined range in which the game controller 1 can perform communication, the game controller 1 can read data from the external storage device or write data to the external storage device. Typically, the predetermined range in which the game controller 1 can perform communication is within a region surrounded by the NFC antenna 26, and the distance from the NFC antenna 26 in the z-axis direction (both the positive and negative z-axis directions) shown in FIG. 18B is within the above extremely short distance. Even an external storage device that does not have a battery can communicate with the game controller 1. If the external storage device is placed in the predetermined range in which the game controller 1 can perform communication, an electromotive force is generated in the external storage device by an electromagnetic wave sent from the NFC antenna 26, and the game controller 1 can communicate with the external storage device. It should be noted that the external storage device may include a power supply and may be able to operate without an electromotive force from the game controller 1. It should be noted that the external storage device may be in any form such as a card, a figure having the shape of a predetermined character, an electronic device such as a mobile phone or a smartphone, or the like.

Figure 19:
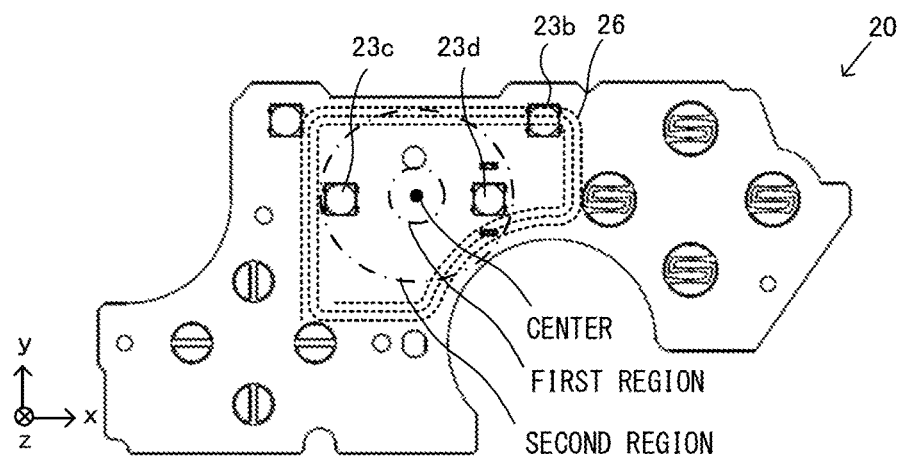
FIG. 19 is a front view of a non-limiting example of the first substrate 20 and a diagram showing a non-limiting example of the state where an NFC antenna 26 placed on a back surface of the first substrate 20 is projected onto a front surface of the first substrate 20.

FIG. 19 is a front view of the first substrate 20 and a diagram showing the state where the NFC antenna 26 placed on the back surface of the first substrate 20 is projected onto the front surface of the first substrate 20. In FIG. 19, the NFC antenna 26 placed on the back surface is indicated by a dashed line.

As shown in FIG. 19, in the region surrounded by the NFC antenna 26, the switch 23c, which corresponds to the capture button 3c, and the switch 23d, which corresponds to the home button 3d, are placed. That is, in a region on the front surface side corresponding to the region on the back surface side surrounded by the NFC antenna 26, the switch 23c, which corresponds to the capture button 3c, and the switch 23d, which corresponds to the home button 3d, are placed. In other words, if the game controller 1 is viewed from the front, the NFC antenna 26 (a region occupied by the NFC antenna 26) overlaps the capture button 3c and the home button 3d. Specifically, in a second region around a first region near the center of the region surrounded by the NFC antenna 26, the switch 23c, which corresponds to the capture button 3c, and the switch 23d, corresponds to the home button 3d, are provided.

Further, on the NFC antenna 26, the switch 23b, which corresponds to the plus button 3b, is placed. The other switches are placed outside the region surrounded by the NFC antenna 26.

If the external storage device (the IC tag) is placed in the region surrounded by the NFC antenna 26, the game controller 1 can communicate with the external storage device. Even if the external storage device is placed outside the region surrounded by the NFC antenna 26, the game controller 1 cannot communicate with the external storage device. It should be noted that "the region surrounded by the antenna" is a region including a portion on the line of the antenna and inside the antenna. Thus, if the external storage device is placed near (held over) the capture button 3c and the home button 3d, which are placed in the center portion of the game controller 1, the game controller 1 can read data stored in the external storage device or write data to the external storage device. On the other hand, even if the external storage device is placed on, for example, the A-button 2a, the B-button 2b, or the directional pad 5, the game controller 1 cannot communicate with the external storage device.

Figure 20:
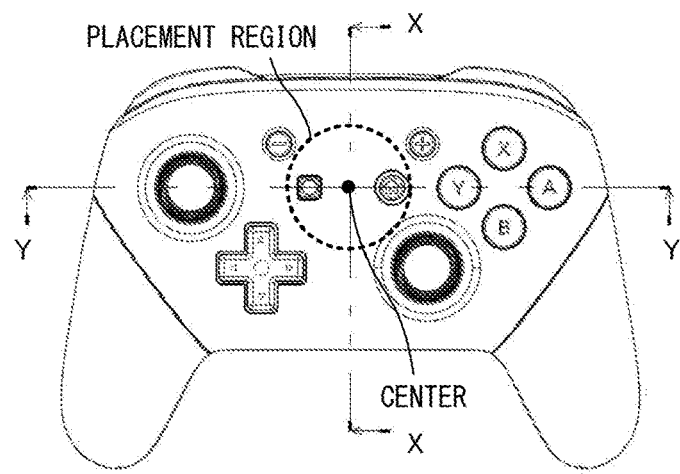
FIG. 20 is a diagram showing a non-limiting example of the position of the NFC antenna 26 in the game controller 1.

FIG. 20 is a diagram showing the position of the NFC antenna 26 in the game controller 1. A center shown in FIG. 20 indicates the center of the region surrounded by the NFC antenna 26 shown in FIG. 19. As shown in FIG. 20, the NFC antenna 26 is placed in the center in the left-right direction of the game controller 1.

As shown in FIG. 20, the capture button 3c and the home button 3d are placed in the center region of the front surface of the game controller 1, and a predetermined region including the positions of the buttons 3c and 3d is the region surrounded by the NFC antenna 26. Thus, the external storage device is placed in a region indicated by a dashed line in FIG. 20. This region has an approximately planar surface and is so shaped as to facilitate the placement of the external storage device. It should be noted that there is a case where even outside the region indicated by a dashed line in FIG. 20, the game controller 1 can communicate with the external storage device. For example, as shown in FIG. 19, a portion near the plus button 3b (the switch 23b) is included in the region surrounded by the NFC antenna 26. Thus, there is a case where even if the external storage device is placed near the plus button 3b, the game controller 1 can communicate with the external storage device. The region indicated by a dashed line including the center in FIG. 20, however, is a region where it is easiest to communicate with the external storage device.

Figure 21:
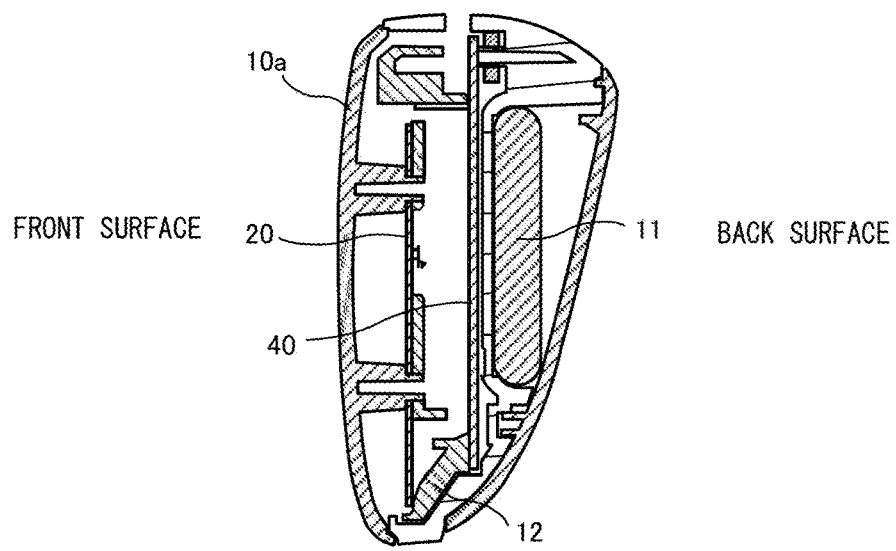
FIG. 21 is a non-limiting example of a cross-sectional view along a line X-X in FIG. 20.
Figure 22:
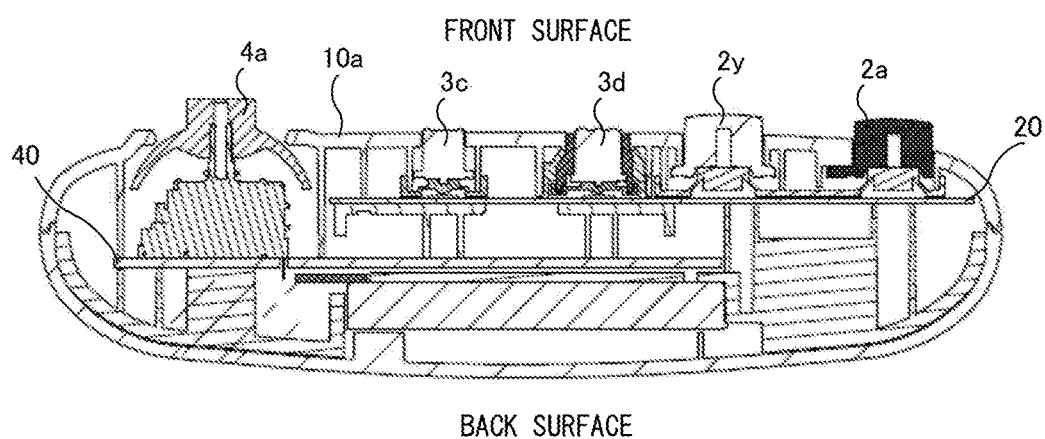
FIG. 22 is a non-limiting example of a cross-sectional view along a line Y-Y in FIG. 20.

FIG. 21 is a cross-sectional view along a line X-X in FIG. 20. FIG. 22 is a cross-sectional view along a line Y-Y in FIG. 20.

As shown in FIG. 21, the first substrate 20 is placed on the front surface side of the game controller 1. That is, the first substrate 20 is provided closer to the front surface than the center of the housing 10 in the front-back direction of the game controller 1 is. Thus, the NFC antenna 26 is placed at a position closer to the front surface of the game controller 1. Thus, if the external storage device is placed on the front surface side, it is easy for the game controller 1 to communicate with the external storage device.

Further, the second substrate 40 is placed on the back surface side of the game controller 1. To the side of the second substrate 40 closer to the back surface, a battery 11 is placed. Further, below the housing 10, a light-guiding member 12 for guiding light from an LED of the second substrate 40 is provided. The light-guiding member guides light from the LED to outside, and the LED 9 emits light.

As shown in FIG. 22, upper surfaces of the key tops of the capture button 3c and the home button 3d have substantially the same heights as that of the surface of the first housing 10a. Since the upper surfaces of the key tops of the capture button 3c and the home button 3d have substantially the same heights as that of the surface of the first housing 10a, even if the external storage device is placed on the capture button 3c and the home button 3d, the capture button 3c and the home button 3d are not pressed.

Here "the upper surface of the key top has substantially the same height as that of the surface of the housing" means such a height that even if the external storage device is placed on the key top, the button is not pressed (such a height that the pressing of the button is not detected). That is, if the external storage device is placed on the capture button 3c and the home button 3d, the upper surfaces of the key tops of the capture button 3c and the home button 3d may be slightly higher than the surface of the first housing 10a insomuch that the capture button 3c and the home button 3d are not pressed (insomuch that the pressing of the capture button 3c and the home button 3d is not detected).

It should be noted that the upper surfaces of the key tops of the capture button 3c and the home button 3d may be lower than the surface of the first housing 10a.

On the other hand, the key tops of the Y-button 2y and the A-button 2a (the same applies to the B-button 2b and the X-button 2x) protrude further upward than the surface of the first housing 10a. If the external storage device is placed on the Y-button 2y, the Y-button 2y is pressed by the external storage device.

Further, as is clear from FIGS. 22, 2, and the like, the capture button 3c and the home button 3d are smaller than the Y-button 2y, the A-button 2a, and the like.

Figure 23:
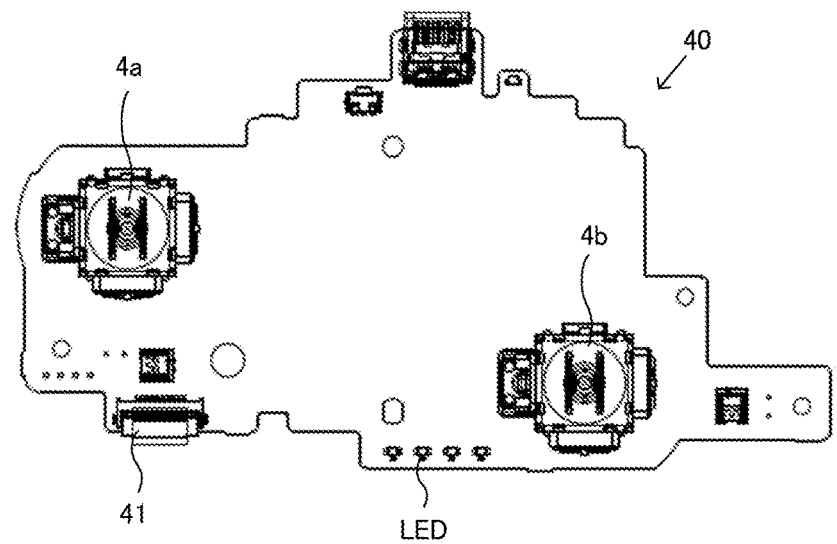
FIG. 23 is a front view of a non-limiting example of a second substrate 40.

FIG. 23 is a front view of the second substrate 40. As shown in FIG. 23, on the front surface of the second substrate 40 (the surface on the front surface side of the game controller 1), the left analog stick 4a is placed on the left side, and the right analog stick 4b is placed on the right side. Further, near the lower end in the center in the left-right direction of the second substrate 40, four LEDs are placed. Further, below the left analog stick 4a, a connection portion 41 is placed. The first substrate 20 and the second substrate 40 are connected together via the connection portion 41.

Figure 24:
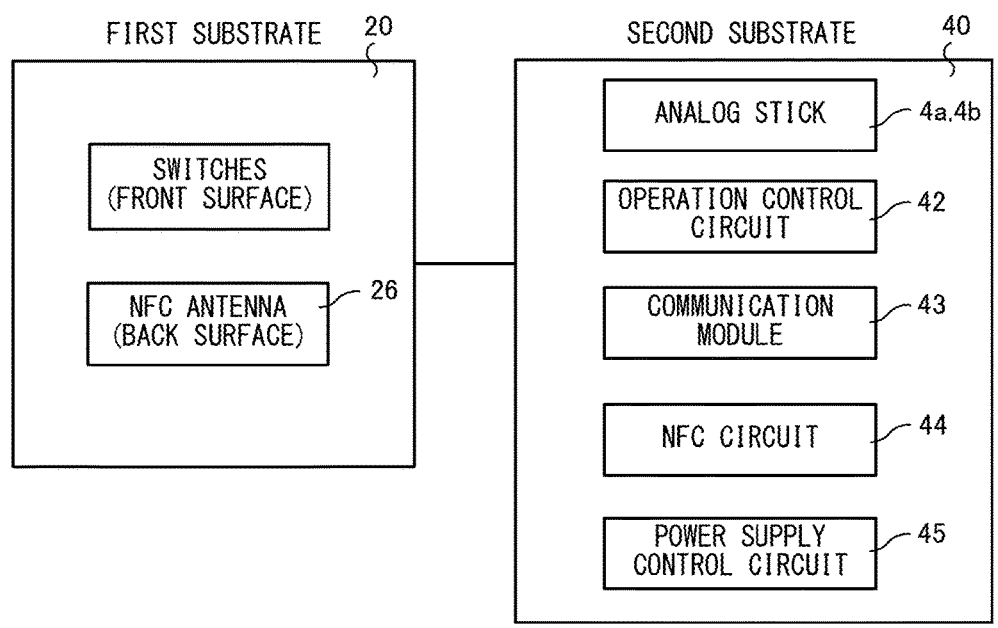
FIG. 24 is a block diagram showing a non-limiting example of the functional configurations of the first substrate 20 and the second substrate 40.

FIG. 24 is a block diagram showing an example of the functional configurations of the first substrate 20 and the second substrate 40. As shown in FIG. 24, in the second substrate 40, in addition to the analog sticks 4a and 4b, various control circuits for controlling the game controller 1 are provided. For example, in the second substrate 40, as control circuits, an operation control circuit 42 for generating and packetizing operation data indicating whether or not each of the buttons (2a, 2b, 2x, 2b, 3a to 3d, 5, 6a, 6b, 7a, and 7b) is pressed, a communication module (a communication circuit and an antenna) 43 for transmitting the operation data to the game apparatus 100, an NFC circuit 44 for controlling NFC communication, a power supply control circuit 45 for controlling power supply, and the like are placed.

Each switch placed on the first substrate 20 is connected to the operation control circuit 42. If each switch placed on the first substrate 20 is pressed, a signal corresponding to the pressing of the switch flows through the second substrate 40. As a result, the operation control circuit 42, which is placed on the second substrate 40, generates and packetizes operation data. Then, the operation data is output to the game apparatus 100 via the communication module. Further, the NFC circuit 44 controls the emission of a radio wave using the NFC antenna 26, the reading of data from the external storage device, the writing of data to the external storage device, and the like.

As described above, the game controller 1 includes the first substrate 20 and the second substrate 40, whereby it is possible to provide a controller with more functions without making the controller itself large. That is, if viewed from the front surface (or the back surface) of the game controller 1, the first substrate 20 and the second substrate 40 overlap each other. Since the substrates thus have a two-layer structure, it is not necessary to increase the areas of the substrates, and it is possible to make the game controller 1 small. Further, the NFC antenna 26 is placed on, between the first substrate 20 and the second substrate 40, the first substrate 20 on the front surface side, whereby it is possible to shorten the distance between the surface of the housing 10 on the front surface side and the NFC antenna 26. This makes it possible to shorten the distance from the external storage device and facilitate communication with the external storage device.

Further, a switch is placed on the front surface of the first substrate 20, and the NFC antenna 26 is placed on the back surface of the first substrate 20 and at the position where the switch is placed, whereby it is possible to place a button in a region where the external storage device is to be placed (held over). This makes it possible to provide the game controller 1 with an NFC communication function and also place various buttons. Normally, to prevent an erroneous operation when the external storage device is read, a reading region (an antenna) for reading the external storage device is placed at the position where no button is provided. In this case, however, the game controller becomes large. In the exemplary embodiment, the upper surface of a button is low, whereby it is possible to prevent an erroneous operation on the button and also place a reading region (an antenna) at the position of the button. This can save space. That is, the upper surface of the button is low, whereby it is possible to solve the problem of an erroneous operation on the button in a case where the button and the reading region for the external storage device are placed so as to overlap each other, and it is possible to make the game controller small. Further, the smaller the area of the NFC antenna, the smaller the range where the game controller can perform communication. Thus, some size is required. If the NFC antenna 26 is placed on a single substrate, it is difficult to place another circuit in the region surrounded by the NFC antenna 26. Thus, in a case where the NFC antenna 26 is placed on a single substrate, and various buttons are placed, the substrate becomes large. Conversely, if various buttons are placed without making the substrate large, the region for the NFC antenna 26 becomes small. In the exemplary embodiment, the substrates have a two-layer structure, and the NFC antenna 26 is placed in the first substrate 20, while a control circuit is placed on the second substrate 40. Thus, it is possible to separate the NFC antenna 26 from another circuit. This increases the degree of freedom for design. Further, switches for operation buttons are provided on the front surface of the first substrate 20, and the NFC antenna 26 is provided on the back surface, whereby it is possible to place the NFC antenna 26, regardless of the positions of the operation buttons.

Further, in the exemplary embodiment, the analog sticks 4a and 4b are placed on the second substrate 40 on the back surface side. Each analog stick is used to input a direction by tilting an operation section of the analog stick and therefore requires some height. Thus, if the second substrate 40 including the analog sticks is placed on the front surface side of the game controller 1, the thickness of the game controller 1 increases. In the exemplary embodiment, the second substrate 40 is placed on the back surface side of the game controller 1, whereby it is possible to configure the game controller 1 to be thin. Further, the analog sticks 4a and 4b are mounted on a substrate (the second substrate 40) and integrated with the substrate, whereby it is possible to reduce the number of components as compared with a case where the analog sticks 4a and 4b are separate components.

Further, the substrates have a two-layer structure, and the NFC antenna 26 is placed on the first substrate 20 at a position close to the front surface of the housing 10, thereby increasing the degree of freedom for placing the second substrate 40. For example, it is possible to place the second substrate 40 in accordance with the heights of the analog sticks. It should be noted that the analog sticks may be mounted on yet another substrate different from the second substrate 40.

It should be noted that the above configuration of the game controller 1 may be applied not only to the two-handed game controller 1, but also to a one-handed controller. For example, the one-handed controller may include a first substrate on the front surface side of the controller and a second substrate on the back surface side of the controller. A switch for a button may be provided on the front surface of the first substrate (the surface on the front surface side of the controller), and an NFC antenna may be provided on the back surface of the first substrate. The switch on the front surface of the first substrate is provided in a region corresponding to a region surrounded by the NFC antenna provided on the back surface of the first substrate. Further, the one-handed controller may include an analog stick, and the analog stick may be provided on the second substrate.

[Description of Vibration Motor]

Figure 25:
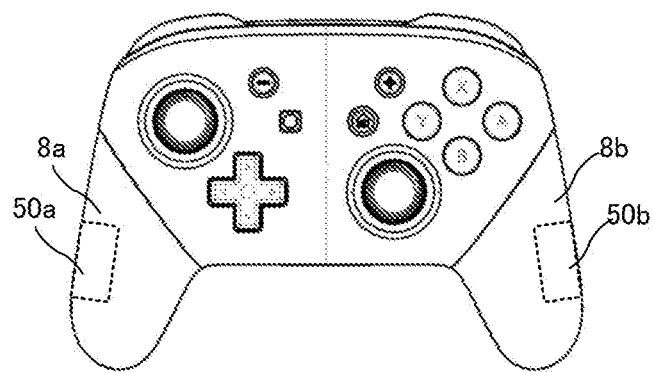
FIG. 25 is a diagram schematically showing a non-limiting example of a vibration motor provided in the grip portion 8 of the game controller 1.

Next, a vibration motor provided in the game controller 1 is described. FIG. 25 is a diagram schematically showing a vibration motor provided in the grip portion 8 of the game controller 1. It should be noted that hereinafter, vibration motors 50a and 50b will be collectively referred to as a "vibration motor 50".

As shown in FIG. 25, within the grip portions 8a and 8b of the game controller 1, the vibration motors 50a and 50b, respectively, are placed. Within the grip portion 8a, the vibration motor 50a is placed on the left side in the left-right direction of the game controller 1. Further, within the grip portion 8b, the vibration motor 50b is placed on the right side in the left-right direction of the game controller 1. That is, the vibration motor 50 is provided on the side of the grip portion 8 that the hand of the user hits.

Figure 26:
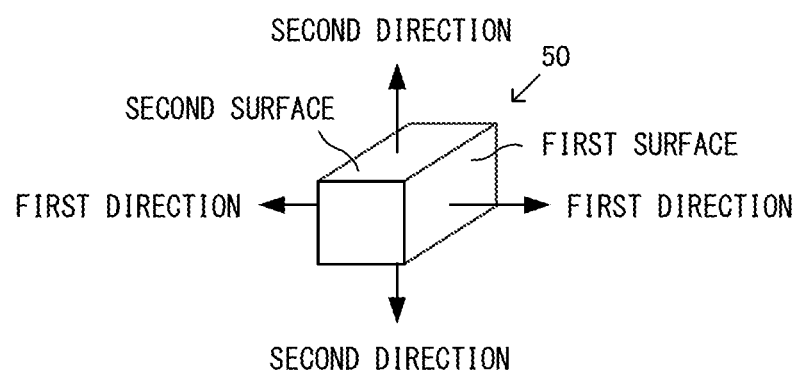
FIG. 26 is a diagram illustrating a non-limiting example of the vibration directions of a vibration motor 50.

FIG. 26 is a diagram illustrating the vibration directions of the vibration motor 50. As shown in FIG. 26, the vibration motor 50 has an approximately cuboid shape having a first surface and a second surface orthogonal to each other. The vibration motor 50 can vibrate in a first direction (the left-right direction) perpendicular to the first surface and can also vibrate in a second direction (the up-down direction) perpendicular to the first direction. Specifically, the vibration motor 50 is configured to linearly vibrate in the first direction at a first resonance frequency and linearly vibrate in the second direction at a second resonance frequency different from the first resonance frequency. For example, the first resonance frequency may be 320 Hz, and the second resonance frequency may be 160 Hz.

Figure 27:
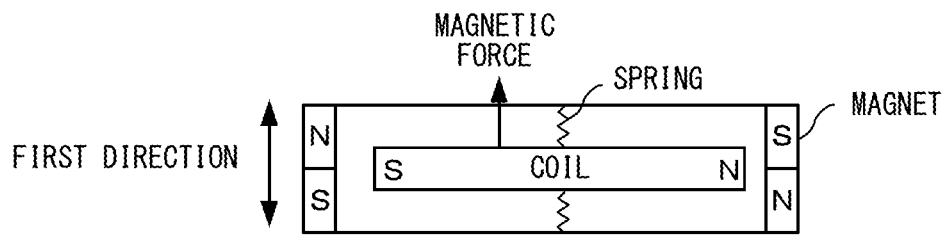
FIG. 27 is a diagram schematically showing a non-limiting example of the operating principle of the vibration motor 50.

Here, the operating principle of the vibration motor 50 is briefly described. FIG. 27 is a diagram schematically showing the operating principle of the vibration motor 50. As shown in FIG. 27, the vibration motor 50 includes a coil, magnets, and springs. A current is applied to the coil, whereby a magnetic force is generated in the up direction, and the coil moves in the up direction. Then, the coil moves in the down direction by the reaction force of the springs. This action is repeated, whereby the vibration motor 50 vibrates at a predetermined resonance frequency in the up-down direction in FIG. 27. In the vibration motor 50, the springs have two resonance frequencies. The vibration motor 50 is configured to vibrate at different resonance frequencies in the up-down direction in FIG. 27 and in a direction perpendicular to the paper in FIG. 27. It should be noted that the vibration motor 50 can also vibrate in an oblique direction by a combined wave obtained by combining a vibration in the first direction and a vibration in the second direction.

Figure 28:
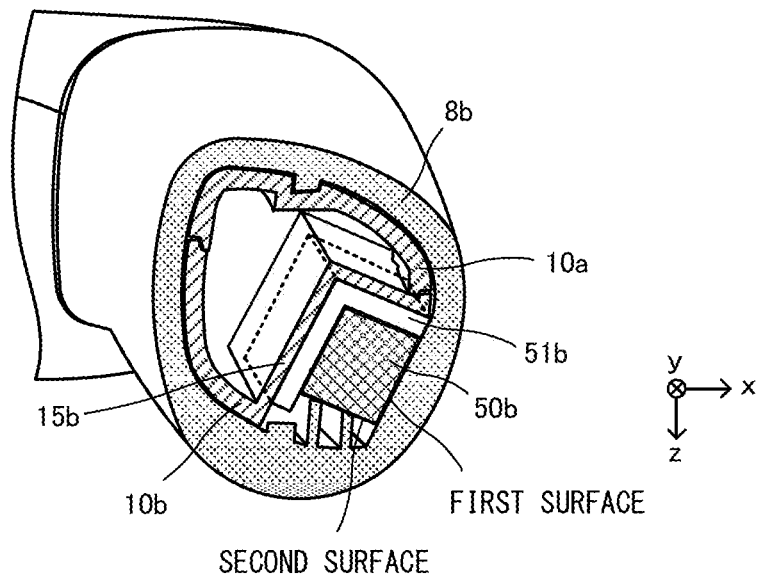
FIG. 28 is a cross-sectional view of a non-limiting example of the grip portion 8b, into which the vibration motor 50b is built, and is a diagram showing a non-limiting example of the internal structure of the grip portion 8b.
Figure 29:
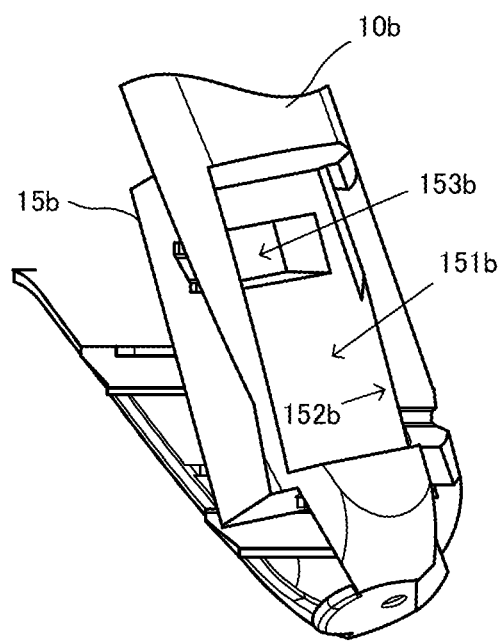
FIG. 29 is a diagram showing a non-limiting example of a second housing 10b on the back surface side of the game controller 1 and is an enlarge view of a non-limiting example of a portion of a second holding portion 18b on the right side of the second housing 10b.
Figure 30:
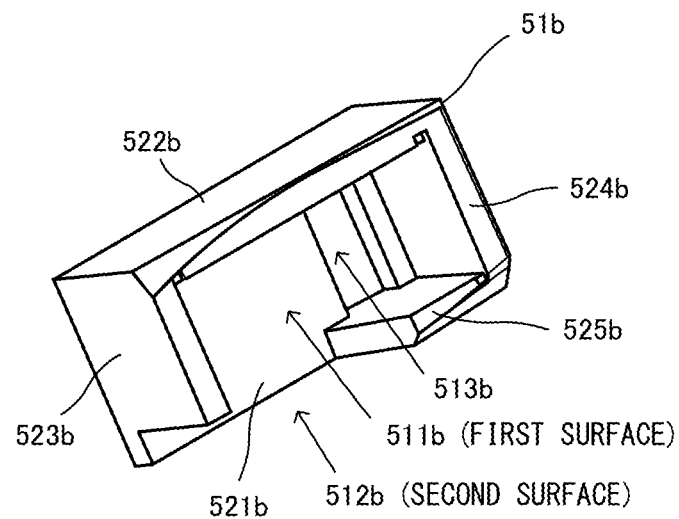
FIG. 30 is a diagram showing a non-limiting example of a holder 51b for fixing the vibration motor 50b within the housing 10.

FIG. 28 is a cross-sectional view of the grip portion 8b, into which the vibration motor 50b is built, and is a diagram showing an example of the internal structure of the grip portion 8b. FIG. 29 is a diagram showing an example of the second housing 10b on the back surface side of the game controller 1 and is an enlarged view of a portion of the second holding portion 18b on the right side of the second housing 10b. FIG. 29 is a diagram showing the second holding portion 18b of the second housing 10b as viewed from the direction of the right side surface. FIG. 30 is a diagram showing an example of a holder 51b for fixing the vibration motor 50b within the housing 10.

As shown in FIG. 28, inside the grip portion 8b, the vibration motor 50b is provided. Specifically, the vibration motor 50b is accommodated in the holder 51b. The holder 51b is used to fix the vibration motor 50b within the housing 10 and is formed of an elastic material likely to absorb the vibration of the vibration motor 50b. For example, the holder 51b is composed of a relatively soft material (a material softer than that of the housing 10) such as a silicon rubber or a synthetic rubber. For example, the material of the holder 51b may be ABS resin. In contrast, the housing 10 (the first housing 10a and the second housing 10b) is composed of a relatively hard material. The holder 51b is fitted (press-fitted) to a vibration motor fixing portion 15b (see FIG. 29), which is a part of the second housing 10b, and is fixed.

As shown in FIGS. 28 and 29, the vibration motor fixing portion 15b has an approximately cuboid shape and includes an opening portion 151b on the right side of the game controller 1, an opening portion 152b on the back surface side of the game controller 1, and an opening portion 153b on the center side of the game controller 1. The vibration motor fixing portion 15b is configured to be of approximately the same size as that of the holder 51b or slightly smaller than the holder 51b. The holder 51b is press-fitted to the vibration motor fixing portion 15b, thereby fixing the holder 51b to the second housing 10b.

As shown in FIG. 30, the holder 51b has an approximately cuboid shape and includes a surface 521b (a surface on the far side in FIG. 30), a surface 522b (a surface on the upper side in FIG. 30), a surface 523b (a surface on the left side in FIG. 30), a surface 524b (a surface on the right side in FIG. 30), and a surface 525b (a surface on the lower side in FIG. 30). Further, a surface on the near side opposed to the surface 521b on the far side of the holder 51b is open (an opening portion 511b in FIG. 30). Further, a part of a surface on the lower side opposed to the surface 522b on the upper side of the holder 51b is open (an opening portion 512b in FIG. 30). The opening portion 511b of the holder 51b is a portion corresponding to the first surface of the vibration motor 50b. The opening portion 512b of the holder 51b is a portion corresponding to the second surface of the vibration motor 50b. That is, if the vibration motor 50b is fitted to the holder 51b, the first surface of the vibration motor 50b is exposed through the opening portion 511b, and the second surface of the vibration motor 50b is exposed through the opening portion 512b. Further, a part of the surface 521b of the holder 51b is open (an opening portion 513b). The opening portion 513b of the holder 51b is configured to, if the holder 51b is fitted to the vibration motor fixing portion 15b of the second housing 10b, coincide with the opening portion 153b of the vibration motor fixing portion 15b. The opening portion 513b of the holder 51b and the opening portion 153b of the vibration motor fixing portion 15b are opening portions through which to pass the wiring of the vibration motor 50b.

Figure 31:
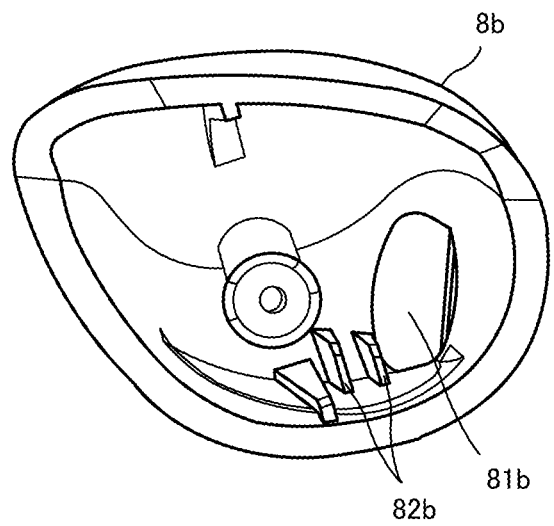
FIG. 31 is a diagram showing a non-limiting example of the internal configuration of the grip portion 8b.

FIG. 31 is a diagram showing an example of the internal configuration of the grip portion 8b. As shown in FIG. 31, on the right side within the grip portion 8b, a surface 81b is provided. Further, on the lower side within the grip portion 8b, two protruding ribs 82b are provided. The surface 81b is an approximately planar surface and is inclined at a predetermined angle when the grip portion 8b is viewed from the direction in FIG. 31. This is to facilitate the pulling out of the grip portion 8b from a mold in the process of manufacturing the grip portion 8b. For example, the surface 81b has a slope at several degrees with respect to the pull-out direction. The surface 81b comes into contact with the first surface of the vibration motor 50b. Further, the ribs 82b come into contact with the second surface of the vibration motor 50b. It should be noted that a portion of the grip portion 8b that comes into contact with the second surface of the vibration motor 50b may not be ribs, and may be an approximately planar surface as in the surface 81b.

With such a configuration, as shown in FIG. 28, if the vibration motor 50b is fixed within the housing 10, the first surface of the vibration motor 50b comes into direct contact with the surface 81b on the right side of the grip portion 8b. Further, the second surface of the vibration motor 50b comes into direct contact with the ribs 82b on the lower side of the grip portion 8b. That is, the vibration motor 50b comes into direct contact with the grip portion 8b on the first surface (a surface corresponding to the first direction in which the vibration motor 50b vibrates at the first resonance frequency) and the second surface (a surface corresponding to the second direction in which the vibration motor 50b vibrates at the second resonance frequency) of the vibration motor 50b. Meanwhile, since the surface of the vibration motor 50b opposed to the housing 10 (10b) is surrounded by the holder 51b, the vibration motor 50b does not come into direct contact with the housing 10, but comes into contact with the housing 10 through the holder 51b.

Here, a thin sheet (e.g., a sheet having a thickness of about 0.1 mm) may be sandwiched between the first surface and the second surface of the vibration motor 50b and the grip portion 8b. That is, "the first surface and the second surface of the vibration motor 50b come into direct contact with the grip portion 8b" also includes a case where a thin sheet (e.g., a sheet having a thickness of about 0.1 to 1 mm) is present between the first surface and the second surface of the vibration motor 50b and the grip portion 8b. Such a sheet is used to bring the vibration motor into firm contact with the housing 10 to prevent rattling, and is not used to make the vibration of the vibration motor 50b less likely to be transmitted to the grip portion 8b. On the other hand, the holder 51b is formed of a material softer and thicker than that of the sheet. Thus, the vibration of the vibration motor 50b is less likely to be transmitted to the grip portion 8b.

It should be noted that the grip portion 8a on the left side is also symmetrical with the grip portion 8b on the right side and is also similar to the grip portion 8b on the right side. That is, also in the grip portion 8a on the left side, similarly to the right side, the vibration motor 50a and a holder 51a are provided. The vibration motor 50a vibrates in a first direction and a second direction, comes into direct contact with the grip portion 8a on a first surface corresponding to the first direction and a second surface corresponding to the second direction, and comes into contact with the housing 10 through the holder 51a.

As described above, the vibration motor 50 is brought into direct contact with the grip portion 8 on the first surface corresponding to the first direction and on the second surface corresponding to the second direction, whereby it is possible to make the vibration of the vibration motor 50 likely to be transmitted to the grip portion 8, and it is possible to make the vibration likely to be transmitted to the hand of the user in contact with the grip portion 8. That is, it is possible to cause the user to feel more vibration. Meanwhile, the vibration motor 50 comes into contact with the housing 10 through the holder 51. The holder 51 is formed of a relatively soft material and therefore is likely to absorb the vibration of the vibration motor 50. Thus, the vibration of the vibration motor 50 is less likely to be transmitted to the housing 10. Thus, for example, it is possible to make the vibration of the vibration motor 50b on the right side less likely to be transmitted to the grip portion 8a on the left side. Thus, it is possible to impart a vibration only to the right hand of the user, or impart vibrations in different vibration patterns to the left and right hands. Further, it is possible to prevent the vibrations of the left and right vibration motors from being mixed with each other and separate the vibration on the left and the vibration on the right from each other.

Further, in the exemplary embodiment, the vibration motor 50 has two different resonance frequencies. Thus, it is possible to impart two vibrations different in feeling to the user and make representations in various vibration patterns.

Further, as shown in FIG. 28, the first surface of the vibration motor 50 comes into contact with the inside of the right side surface of the grip portion 8b. Further, the second surface of the vibration motor 50 comes into contact with the inside of the back surface of the grip portion 8b (a surface on the lower side in FIG. 28).

The first direction, which is the vibration direction of the vibration motor 50, is the substantial left-right direction of the game controller 1 (the x-axis direction). As shown in FIG. 4, if the user holds the game controller 1 with both hands, for example, the right side surface of the grip portion 8b hits an approximate center portion of the palm of the right hand of the user. Thus, the first direction, which is the vibration direction of the vibration motor 50b, is approximately perpendicular to the palm of the user. Thus, the vibration in the first direction is likely to be transmitted to the palm of the user.

Further, the second direction, which is the vibration direction of the vibration motor 50, is the substantial front-back direction of the game controller 1 (the z-axis direction: the up-down direction in FIG. 28). As shown in FIG. 4, if the user holds the game controller 1 with both hands, the back surface of the grip portion 8 hits the middle finger, the third finger, and the little finger of the user. Thus, the second direction, which is the vibration direction of the vibration motor 50, is approximately perpendicular to the middle finger, the third finger, and the little finger of the user. Thus, the vibration in the second direction is likely to be transmitted to the fingers of the user.

In the exemplary embodiment, the resonance frequency in the second direction is lower than the resonance frequency in the first direction. This makes it possible to cause the user to feel different types of vibrations. In the exemplary embodiment, the first surface of the vibration motor 50b comes into contact with the inside of the right side surface of the grip portion 8b, and the second surface of the vibration motor 50b comes into contact with the inside of the lower side surface of the grip portion 8b. Thus, a vibration having a high resonance frequency is likely to be transmitted to the right side surface of the grip portion 8b, and a vibration having a low resonance frequency is likely to be transmitted to the lower side surface of the grip portion 8b. The right side surface of the grip portion 8b hits the center portion of the palm of the user, and the lower side surface of the grip portion 8b hits the finger of the user. Thus, it is possible to impart a vibration having a high resonance frequency to the center portion of the palm of the user and impart a vibration having a low resonance frequency to the finger of the user. As described above, resonance frequencies are different between the first direction and the second direction, whereby it is possible to impart vibrations having different frequencies to portions of the hand of the user. It should be noted that the resonance frequency in the second direction may be higher than the resonance frequency in the first direction.

Further, in the exemplary embodiment, as shown in FIG. 28, the grip portion 8b is formed such that the thickness of the right side surface of the grip portion 8b is thinner than that of the lower surface of the grip portion 8b. That is, the grip portion 8 includes a first portion (a right side surface portion) and a second portion (a lower surface portion), which is thicker than the first portion. The first surface of the vibration motor 50 comes into contact with the first portion of the grip portion 8. The vibration motor 50 comes into contact with the thinner first portion of the grip portion 8. Thus, the vibration in the first direction is more likely to be transmitted to the hand of the user.

It should be noted that the above configuration is merely illustrative. Alternatively, another configuration may be employed. For example, the vibration motor 50 (the holder 51) is fixed to the second housing 10b on the back surface side, but may be fixed to the first housing 10a. Alternatively, the vibration motor 50 may be fixed by being sandwiched between the first housing 10a and the second housing 10b. Further, the vibration motor 50 may be fixed not to the second housing 10b but to the grip portion 8. In a case where the vibration motor 50 is fixed to the grip portion 8, it is possible to prevent the vibration motor 50 from coming into direct or indirect contact with the housing 10.

Further, as a configuration for making the vibration of the vibration motor 50 less likely to be transmitted to the housing 10, a rib (a protruding portion) may be provided inside the holder 51 (a surface with which the vibration motor 50 comes into contact), thereby making the vibration of the vibration motor 50 likely to attenuate.

Further, when the holder 51 is fixed to the second housing 10b, a floating structure may be employed, in which the second housing 10b does not come into contact with the entirety of four surfaces of the holder 51 (four surfaces except for the opening portions), and the holder 51 comes into partial contact with the second housing 10b. For example, a plurality of ribs (protruding portions) may be provided in the second housing 10b, and the holder 51 may be fixed to the second housing 10b such that the holder 51 is spaced from the second housing 10b.

Further, in the above exemplary embodiment, the surface 81b is placed on the right side of the inner surface of the grip portion 8b, and the ribs 82b are placed on the lower side of the inner surface of the grip portion 8b. Alternatively, the ribs 82b may be placed on the right side, and the surface 81b may be placed on the lower side. Alternatively, surfaces may be provided on both the right side and the lower side. That is, both two surfaces of the grip portion 8 that come into contact with the vibration motor 50 may be planar surfaces, or may have ribs. Alternatively, one of the two surfaces may have ribs, and the other may be a planar surface.

Further, in the above exemplary embodiment, the structure is such that the vibration motor 50b comes into direct contact with the right side (the side surface side of the game controller 1) and the lower side of the grip portion 8b. Alternatively, the structure may be such that the vibration motor 50b comes into direct contact with the left side of the grip portion 8b (the center side of the game controller 1).

Further, in the game controller 1, the vibration motors 50 are provided in the left and right grip portions 8, and another vibration motor may also be provided within the main body of the housing 10 (within the housing 10 in which the substrates and the like are placed). This vibration motor provided within the main body of the housing 10 may be a vibration motor for vibrating in the first direction and the second direction similarly to the vibration motors 50 provided in the grip portions 8, or may be a vibration motor for vibrating only in a single direction, or may be an eccentric vibration motor.

Further, in the above exemplary embodiment, a single vibration motor 50 capable of vibrating in the first direction and the second direction is used. Alternatively, in another exemplary embodiment, a vibration motor for vibrating only in the first direction and a vibration motor for vibrating only in the second direction may be combined, thereby enabling vibrations in the first direction and the second direction.

Further, in the above exemplary embodiment, in a case where the vibration motor vibrates in the left-right direction (the x-axis direction) and the front-back direction (the z-axis direction), i.e., directions approximately perpendicular to the surfaces of the game controller 1 that come into contact with the hand of the user, the user is more likely to feel vibrations at their hand than in a case where the vibration motor vibrates in the up-down direction (the y-axis direction). Thus, the vibration motor vibrates substantially in the left-right direction and the front-back direction (see FIG. 28). In another exemplary embodiment, the vibration motor may vibrate in the substantial up-down direction of the game controller 1 (the y-axis direction: the longitudinal direction of the grip portion 8).

Further, the vibration motor described above may be provided not only in the two-handed game controller 1, but also in a one-handed controller. For example, the one-handed controller may include a portion to be held by the user, and a vibration motor is placed in the portion to be held. The vibration motor can vibrate at different resonance frequencies in a first direction and a second direction, and is configured to come into direct contact with a housing on a first surface corresponding to the first direction and a second surface corresponding to the second direction.

[Details of Structure of Home Button]

Next, the detailed structure of the home button 3d is described. It should be noted that the housing 10 of the game controller 1 according to the exemplary embodiment is transparent or white, for example. The home button 3d is configured such that the periphery of the button emits light. A description is given below of the structure for causing the periphery of the home button 3d to emit light.

Figure 32:
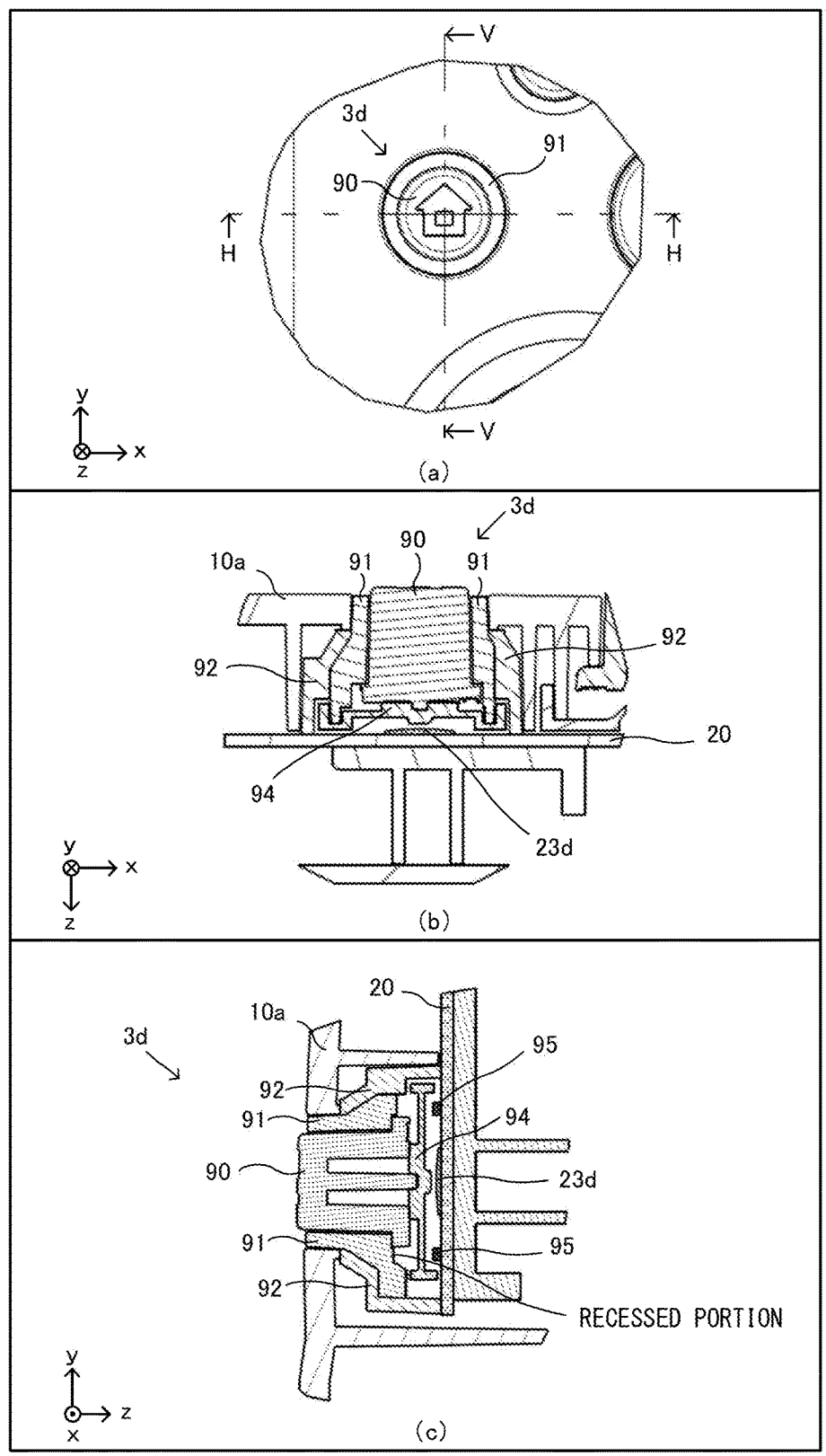
FIG. 32 is a diagram showing a non-limiting example of the structure of a home button 3d.

FIG. 32 is a diagram showing an example of the structure of the home button 3d. (a) of FIG. 32 is a partially enlarged view of the home button 3d. (b) of FIG. 32 is a cross-sectional view along a line H-H in (a) of FIG. 32. (c) of FIG. 32 is a cross-sectional view along a line V-V in (a) of FIG. 32.

As shown in FIG. 32, the home button 3d includes a key top 90, which is pressed by the user, and a light-guiding portion 91, which surrounds the periphery of the key top 90. The key top 90 has a columnar shape and is a member through which light cannot pass. The light-guiding portion 91 is a cylindrical member surrounding the outer periphery of the key top 90. It should be noted that the "cylindrical member" as used herein also includes a ring-shaped member. The light-guiding portion 91 is formed of a material through which light can pass, and guides light incident thereon to the surface of the housing 10 while diffusing the light.

As shown in (b) and (c) of FIG. 32, the outer periphery of the light-guiding portion 91 is surrounded by the cylindrical light-shielding portion 92. The light-shielding portion 92 is a member through which light cannot pass.

Immediately below the key top 90 of the home button 3d, the switch 23d is placed. Between the key top 90 and the switch 23d, an elastic member 94 is provided. The elastic member 94 is formed of a rubber-like material through which light can pass.

Further, below the elastic member 94, two LEDs 95 are provided on the first substrate 20, on which the switch 23d is provided. The two LEDs 95 are placed at positions below the elastic member 94 and overlapping the elastic member 94 (positions covered with the elastic member 94). Specifically, the two LEDs 95 are placed inside a region surrounded by the light-shielding portion 92 and are placed immediately below the light-guiding portion 91. The two LEDs 95 are placed symmetrically in the up-down direction (in the y-axis direction) with respect to the key top 90 ((c) of FIG. 32 or FIG. 18A).

The elastic member 94 pushes up the key top 90 in the up direction (the direction of the front surface of the game controller 1: the negative z-axis direction). If the key top 90 is pressed downward, the key top 90 pushes down the elastic member 94, the force of the pushing down deforms the elastic member 94, and the switch 23d is pressed through the elastic member 94. Even if the key top 90 is pressed, the light-guiding portion 91 and the light-shielding portion 92 around the key top 90 are not pushed down.

As shown in (b) and (c) of FIG. 32, an upper surface of the key top 90 and an upper surface of the light-guiding portion 91 are exposed through the surface of the housing 10. The upper surface of the key top 90 and the upper surface of the light-guiding portion 91 have substantially the same heights as that of the surface of the housing 10. Specifically, the upper surface of the key top 90, which is pressed by the user, is slightly higher than the surface of the housing 10 and is slightly higher than the upper surface of the light-guiding portion 91.

On the other hand, an upper surface of the light-shielding portion 92 is lower than the upper surface of the key top 90 and the upper surface of the light-guiding portion 91 and is not exposed through the surface of the housing 10. It should be noted that the upper surface of the light-shielding portion 92 may be exposed through the surface of the housing 10.

Light emitted from the two LEDs 95 passes through the elastic member 94, is incident on the light-guiding portion 91 immediately above the LEDs 95, passes through the inside of the light-guiding portion 91, and is guided to the surface of the first housing 10a. The light-guiding portion 91 is surrounded by the light-shielding portion 92, through which light cannot pass. Further, the key top 90 does not allow light to pass therethrough, either. Thus, if the two LEDs 95 emit light, the light-guiding portion 91 around the key top 90 emits light on the surface of the first housing 10a, and the light does not come out to the periphery of the light-guiding portion 91. Thus, even if the housing 10 is composed of a transparent member, a white member that makes light likely to pass therethrough, or the like, it is possible to cause only the periphery of the key top 90 to emit light in a ring-shaped manner.

As shown in (c) of FIG. 32, in a portion of the light-guiding portion 91 immediately above the two LEDs 95 (in the negative z-axis direction), recessed portions are formed. These recessed portions are formed so as to surround the LEDs 95 and are used to make larger the incident areas on which light from the LEDs 95 is incident.

Figure 33:
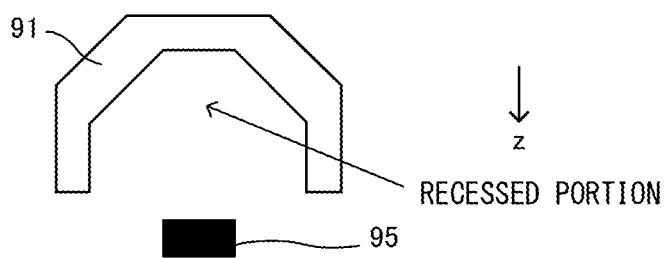
FIG. 33 is a diagram schematically showing a non-limiting example of each of recessed portions of a light-guiding portion 91 provided immediately above two LEDs 95.

FIG. 33 is a diagram schematically showing an example of each of the recessed portions of the light-guiding portion 91 provided immediately above the two LEDs 95. FIG. 33 is a diagram showing a portion including each LED 95 and the recessed portion of the light-guiding portion 91 in (c) of FIG. 32 when cut along an x-z plane in (c) of FIG. 32 and viewed from the positive y-axis direction. The down direction in FIG. 33 corresponds to the positive z-axis direction in FIG. 32. As shown in FIG. 33, the light-guiding portion 91 is formed so as to surround the LED 95. As described above, the recessed portion is formed in the light-guiding portion 91 so as to surround the LED 95, and thereby can receive light from the LED 95 in a wider surface area and make it easy to take the light into the light-guiding portion 91. It should be noted that the shapes of the recessed portions immediately above the two LEDs 95 are merely illustrative. Alternatively, the recessed portions may be formed into circular arc shapes, for example.

Figure 34:
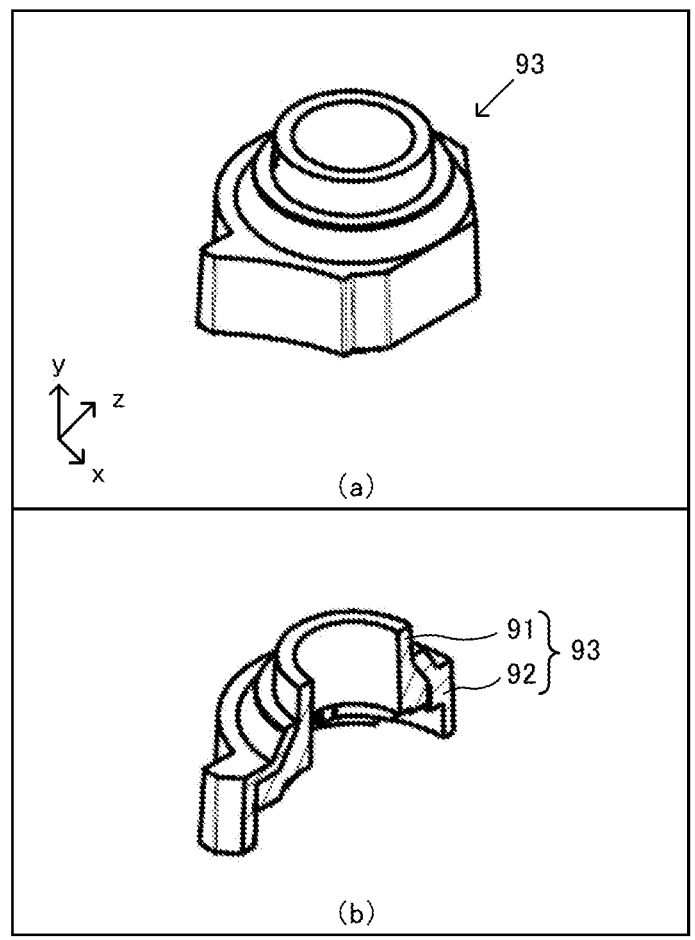
FIG. 34 is a perspective view of a non-limiting example of an integrally molded member 93, which is obtained by forming the light-guiding portion 91 and a light-shielding portion 92 in an integrated manner.

Here, the light-guiding portion 91 and the light-shielding portion 92 are formed in an integrated manner. FIG. 34 is a perspective view of an integrally molded member 93, which is obtained by forming the light-guiding portion 91 and the light-shielding portion 92 in an integrated manner. (a) of FIG. 34 is an external perspective view of the integrally molded member 93. (b) of FIG. 34 is a cross-sectional view of the integrally molded member 93 when cut along a plane parallel with the y-axis. As shown in FIG. 34, in the integrally molded member 93, the light-shielding portion 92 is formed so as to surround the outer periphery of the light-guiding portion 91. In the integrally molded member 93, the light-guiding portion 91 and the light-shielding portion 92 are formed in an integrated manner by two-color molding. It should be noted that the light-guiding portion 91 and the light-shielding portion 92 may be separately molded, and the two members may be assembled together.

As described above, the home button 3d of the game controller 1 according to the exemplary embodiment includes the cylindrical light-guiding portion 91, which surrounds the outer periphery of the key top 90, and the cylindrical light-shielding portion 92, which surrounds the periphery of the light-guiding portion 91. This makes it possible to configure the home button 3d such that only the periphery of the home button 3d (the key top 90 to be pressed by the user) emits light in a ring-shaped manner, while the other portion does not emit light.

In the exemplary embodiment, with a simple structure as described above, it is possible to cause the periphery of the key top 90 to emit light.

It should be noted that in the exemplary embodiment, the key top 90 is a member through which light cannot pass. Alternatively, the key top 90 may be composed of a member through which light can pass. If such a key top is used, it is possible to cause the key top of the home button 3d and the periphery of the key top to emit light.

Further, if a structure for pushing up the key top 90 in the direction opposite to the pressing direction is provided, the elastic member 94 may not need to be provided. Further, in (c) of FIG. 32, the elastic member 94 is placed at the position where the elastic member 94 overlaps the LEDs 95 (the position where the elastic member 94 covers the LEDs 95 from above). Alternatively, the elastic member 94 may be made smaller so as not to overlap the LEDs 95 (so as not to cover the LEDs 95).

Further, in the above exemplary embodiment, the light-guiding portion 91 is surrounded by the light-shielding portion 92. Alternatively, a light-shielding agent is applied to the outer periphery of the light-guiding portion 91, thereby preventing light from coming out of the light-guiding portion 91. Such an applied light-shielding agent can be used as an alternative to the light-shielding portion 92.

As described above, the game controller 1 according to the exemplary embodiment includes the above components. The above components may be used not only in a two-handed game controller, but also in another controller.

For example, the above components may be applied not only to the two-handed game controller 1, but also to a one-handed controller. For example, the R-button and the ZR-button may be provided in the one-handed controller. Further, the configurations of the grip portion, the NFC function, the vibration motor, and the home button may be applied to the one-handed controller.

Further, the components provided in the above game controller 1 may be provided in a mobile game apparatus including a display apparatus and a processing apparatus capable of executing game processing. For example, the mobile game apparatus may include the L/R button and the ZL/ZR button of the game controller 1. Further, the configurations of the grip portion, the NFC function, the vibration motor, and the home button may be applied to the mobile game apparatus.

Further, the components of the above game controller 1 may be applied to a peripheral device for any information processing apparatus such as a PC or a smartphone. For example, the configurations of the R-button and the ZR-button may be applied to a peripheral device for a smartphone. Further, the configurations of the grip portion, the NFC function, the vibration motor, and the home button may be applied to the peripheral device.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game controller comprising:
a housing including an aperture portion;
a key top of an operation button exposed through the aperture portion and configured to be pressed with a finger of a user;
a light-emitting section;
a tubular light-guiding portion configured to guide light from the light-emitting section and surrounding an outer periphery of the key top;
a light-shielding portion surrounding an outer periphery of the light-guiding portion; and
a switch placed below the key top, wherein
an upper surface of the key top and an upper surface of the light-guiding portion are exposed through the aperture portion.

2. The game controller according to claim 1, wherein the switch is placed below a center of the key top.

3. The game controller according to claim 1, further comprising
an elastic portion placed below the key top and configured to bias the key top in a direction opposite to a pressing direction, wherein
when the key top is pressed, the key top comes into contact with the switch through the elastic portion.

4. The game controller according to claim 3, wherein the elastic portion is formed of a light-guiding material, and
the light-emitting section is placed below the elastic portion and at a position where the light-emitting section overlaps the elastic portion.

5. The game controller according to claim 1, wherein the light-shielding portion is tubular.

6. The game controller according to claim 1, wherein the light-emitting section is placed inside a region surrounded by the light-shielding portion.

7. The game controller according to claim 1, wherein as the light-emitting section, a plurality of light-emitting sections are provided.

8. The game controller according to claim 1, wherein as the light-emitting section, a plurality of light-emitting sections are placed at positions symmetrical with respect to a center of the key top.

9. The game controller according to claim 1, wherein the light-shielding portion is not exposed through a surface of the housing.

10. The game controller according to claim 1, wherein even when the key top is pressed, the light-guiding portion is not pressed in a direction of pressing the key top.

11. The game controller according to claim 1, wherein the switch and the light-emitting section are placed on a substrate provided in the housing.

12. The game controller according to claim 1, wherein an upper surface of the light-guiding portion has substantially the same height as a surface of the housing.

13. The game controller according to claim 1, wherein an upper surface of the key top has substantially the same height as a surface of the housing.

14. The game controller according to claim 1, wherein the operation button is a home button.

15. A game controller comprising:
a housing with an aperture;
an operation button with a key top that extends through the aperture and is configured to be pressed with a finger of a user;
a light emitter;
a tubular light-guide configured to guide light from the light emitter and that surrounds an outer periphery of the key top;
a light shield that surrounds an outer periphery of the tubular light-guide; and
a switch below the key top, wherein
an upper surface of the key top and an upper surface of the light-guide are exposed through the aperture.

* * * * *